(12) United States Patent
Moon et al.

(10) Patent No.: US 10,990,199 B2
(45) Date of Patent: Apr. 27, 2021

(54) ELECTRONIC DEVICE INCLUDING DIGITAL PEN

(71) Applicant: Samsung Electronics Co., Ltd., Suwon-si (KR)

(72) Inventors: Byunghyuk Moon, Suwon-si (KR); Banghyun Kwon, Suwon-si (KR); Hyunwoong Kwon, Suwon-si (KR); Junki Jeong, Suwon-si (KR); Jongwu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/519,494

(22) Filed: Jul. 23, 2019

(65) Prior Publication Data
US 2020/0033962 A1 Jan. 30, 2020

(30) Foreign Application Priority Data

Jul. 30, 2018 (KR) ........................ 10-2018-0088887

(51) Int. Cl.
*G06F 3/0354* (2013.01)
*G06F 3/02* (2006.01)
(Continued)

(52) U.S. Cl.
CPC ........ *G06F 3/03545* (2013.01); *G06F 3/0202* (2013.01); *G06F 3/038* (2013.01); *G06F 2203/0384* (2013.01); *H04M 1/0254* (2013.01)

(58) Field of Classification Search
CPC .......... G06F 3/0383; G06F 3/02; G06F 3/038; G06F 3/03545; G06F 2203/0384; H04M 1/0254
See application file for complete search history.

(56) References Cited

U.S. PATENT DOCUMENTS 9,619,052 B2   4/2017  Bernstein et al.
9,658,704 B2   5/2017  Bernstein et al.
(Continued)

FOREIGN PATENT DOCUMENTS

EP   2 701 052 A2   2/2014
EP   3 079 040 A1   10/2016
(Continued)

OTHER PUBLICATIONS

International Search Report dated Nov. 12, 2019, issued in International Patent Application No. PCT/KR2019/009073.
(Continued)

*Primary Examiner* — Charles V Hicks
(74) *Attorney, Agent, or Firm* — Jefferson IP Law, LLP

(57) ABSTRACT

An electronic device using a digital pen is provided. The electronic device includes a digital pen, a wireless communication circuit, a processor, and a memory operatively connected to the processor. The memory stores instructions which, when executed, cause the processor to receive a first input through the wireless communication circuit from the digital pen, identify whether a first application or a second application is being executed based on the reception of the first input, when the first application is being executed, identify and perform a first operation associated with the first application from one or more operations corresponding to the first input, and when the second application is being executed, identify and perform a second operation associated with the second application from the one or more operations corresponding to the first input, wherein the first application is different from the second application.

20 Claims, 21 Drawing Sheets

(51) Int. Cl.
*G06F 3/038* (2013.01)
*H04M 1/02* (2006.01)

(56) References Cited

U.S. PATENT DOCUMENTS

| | | |
|---|---|---|
| 9,753,556 B2 | 9/2017 | Bernstein et al. |
| 9,785,259 B2 | 10/2017 | Cueto et al. |
| 9,916,019 B2 | 3/2018 | Lee et al. |
| 9,946,510 B2 | 4/2018 | Namgung et al. |
| 10,007,362 B2 | 6/2018 | Kim et al. |
| 10,251,034 B2* | 4/2019 | Langlois ............... H04L 67/148 |
| 10,365,732 B2 | 7/2019 | Bernstein et al. |
| 10,509,492 B2 | 12/2019 | Zhang et al. |
| 2009/0160792 A1* | 6/2009 | Morohoshi ........... G06F 3/0488 345/173 |
| 2014/0055427 A1 | 2/2014 | Kim et al. |
| 2014/0059428 A1 | 2/2014 | Jeong et al. |
| 2014/0152576 A1 | 6/2014 | Kim et al. |
| 2014/0160045 A1 | 6/2014 | Park et al. |
| 2014/0245139 A1 | 8/2014 | Lee et al. |
| 2014/0253461 A1* | 9/2014 | Hicks ..................... G06F 21/31 345/173 |
| 2014/0253520 A1 | 9/2014 | Cueto et al. |
| 2015/0065200 A1* | 3/2015 | Namgung ............... G06F 3/016 455/566 |
| 2015/0103014 A1 | 4/2015 | Kim et al. |
| 2016/0054821 A1 | 2/2016 | Kim et al. |
| 2016/0147388 A1 | 5/2016 | Shin et al. |
| 2016/0282964 A9 | 9/2016 | Kim et al. |
| 2016/0299585 A1 | 10/2016 | Lee et al. |
| 2017/0322642 A1 | 11/2017 | Zhang et al. |
| 2018/0173330 A1 | 6/2018 | Lee et al. |
| 2019/0220109 A1 | 7/2019 | Bernstein et al. |
| 2019/0361694 A1* | 11/2019 | Gordon ................... G06F 1/169 |

FOREIGN PATENT DOCUMENTS

| | | |
|---|---|---|
| EP | 3 211 509 A1 | 8/2017 |
| JP | 2004-264734 A | 9/2004 |
| KR | 10-2014-0023785 A | 2/2014 |
| KR | 10-2015-0027542 A | 3/2015 |
| KR | 10-1520953 B1 | 5/2015 |
| WO | 2017/183743 A1 | 10/2017 |

OTHER PUBLICATIONS

European Search Report dated Dec. 17, 2019, issued in European Patent Application No. 19188655.5.

* cited by examiner (a)

(b)

(c)

ELECTRONIC DEVICE INCLUDING DIGITAL PEN

CROSS-REFERENCE TO RELATED APPLICATION(S)

This application is based on and claims priority under 35 U.S.C. § 119(a) of a Korean patent application number 10-2018-0088887, filed on Jul. 30, 2018, in the Korean Intellectual Property Office, the disclosure of which is incorporated by reference herein its entirety.

BACKGROUND

1. Field

The disclosure relates to an input technology using a digital pen.

2. Description of Related Art

A mobile device is a device which is portable and includes at least one of a function of performing voice and video calls, a function of inputting or outputting information, and a function of storing data.

As the functions of such a mobile device have diversified, the mobile device has been equipped with complicated functions such as photographing of a picture or video, playback of music files or video files, games, reception of broadcasts, wireless Internet, and the like. In addition, for the convenience of a user, the mobile device has been implemented in a form that is capable of controlling the operation of the mobile device using a digital pen (e.g., a stylus pen).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device for performing different operations corresponding to user inputs according to an executed application, and may transmit guide information on an executed operation.

An electronic device may receive the user input by sensing the contact position of the digital pen or a position within a specified distance. In other words, the electronic device can perform the designated operation through a direct touching input or a non-contact hovering input. In addition, even if the buttons included in the digital pen are used, the operation that can be controlled according to the input is limited, and the types of applications (or application programs) that can be controlled can be limited.

In accordance with an aspect of the disclosure, an electronic device is provided. The electronic device includes a digital pen, a wireless communication circuit, a processor, and a memory operatively connected to the processor, wherein the memory stores instructions which, when executed, cause the processor to receive a first input through the wireless communication circuit from the digital pen, identify whether a first application or a second application is being executed based on the reception of the first input, when the first application is being executed, identify and perform a first operation associated with the first application from one or more operations corresponding to the first input, and when the second application is being executed, identify and perform a second operation associated with the second application from the one or more operations corresponding to the first input, wherein the first application is different from the second application, and wherein the first operation is different from the second operation.

Additional aspects will be set forth in part in the description which follows and, in part, will be apparent from the description, or may be learned by practice of the presented embodiments.

In accordance with another aspect of the disclosure, a method of controlling an electronic device including a digital pen is provided. The method includes receiving a first input from the digital pen, identifying whether a first application or a second application is being executed based on the reception of the first input, when the first application is being executed, identifying and performing a first operation associated with the first application from one or more operations corresponding to the first input, and when the second application is being executed, identifying and performing a second operation associated with the second application from the one or more operations corresponding to the first input, wherein the first application is different from the second application, and wherein the first operation is different from the second operation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
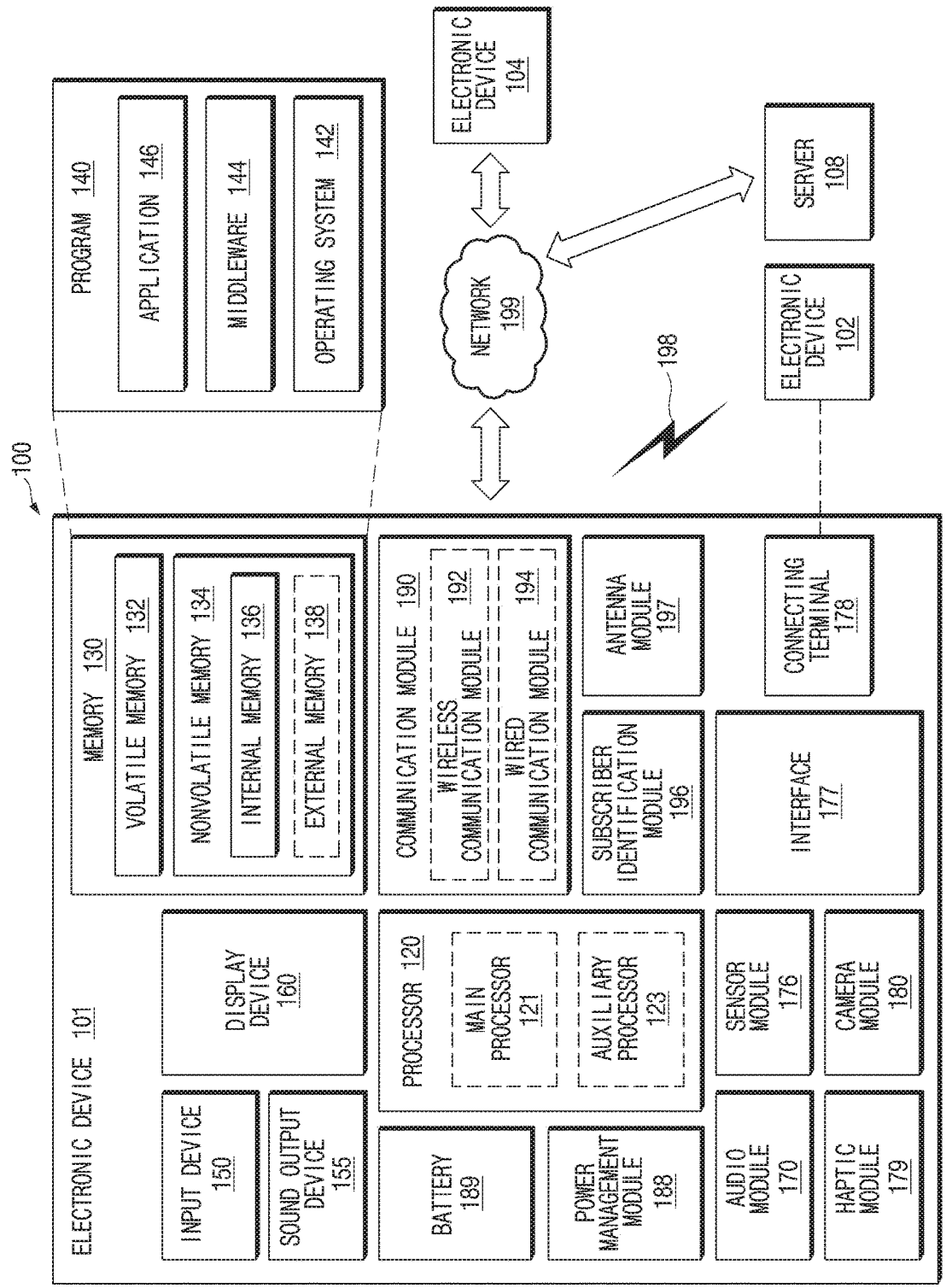
FIG. 1 is a block diagram of an electronic device in a network environment according to an embodiment of the disclosure.

FIG. 1 is a block diagram of an electronic device in a network environment according to various embodiments of the disclosure.

Referring to FIG. 1, an electronic device 101 may communicate with an electronic device 102 through a first network 198 (e.g., a short-range wireless communication network) or may communicate with an electronic device 104 or a server 108 through a second network 199 (e.g., a long-distance wireless communication network) in a network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. According to some embodiments, at least one (e.g., the display device 160 or the camera module 180) among components of the electronic device 101 may be omitted or one or more other components may be added to the electronic device 101. According to some embodiments, some of the above components may be implemented with one integrated circuit. For example, the sensor module 176 (e.g., a fingerprint sensor, an iris sensor, or an illuminance sensor) may be embedded in the display device 160 (e.g., a display).

The processor 120 may execute, for example, software (e.g., a program 140) to control at least one of other components (e.g., a hardware or software component) of the electronic device 101 connected to the processor 120 and may process or compute a variety of data. According to an embodiment, as a part of data processing or operation, the processor 120 may load a command set or data, which is received from other components (e.g., the sensor module 176 or the communication module 190), into a volatile memory 132, may process the command or data loaded into the volatile memory 132, and may store result data into a nonvolatile memory 134. According to an embodiment, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121. Additionally or alternatively, the auxiliary processor 123 may use less power than the main processor 121, or is specified to a designated function. The auxiliary processor 123 may be implemented separately from the main processor 121 or as a part thereof.

The auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to an embodiment, the auxiliary processor 123 (e.g., the image signal processor or the communication processor) may be implemented as a part of another component (e.g., the camera module 180 or the communication module 190) that is functionally related to the auxiliary processor 123.

The memory 130 may store a variety of data used by at least one component (e.g., the processor 120 or the sensor module 176) of the electronic device 101. For example, data may include software (e.g., the program 140) and input data or output data with respect to commands associated with the software. The memory 130 may include the volatile memory 132 or the nonvolatile memory 134.

The program 140 may be stored in the memory 130 as software and may include, for example, an operating system 142, a middleware 144, or an application 146.

The input device 150 may receive a command or data, which is used for a component (e.g., the processor 120) of the electronic device 101, from an outside (e.g., a user) of the electronic device 101. The input device 150 may include, for example, a microphone, a mouse, a keyboard, or a digital pen (e.g., a stylus pen).

The sound output device 155 may output a sound signal to the outside of the electronic device 101. The sound output device 155 may include, for example, a speaker or a receiver. The speaker may be used for general purposes, such as multimedia play or recordings play, and the receiver may be used for receiving calls. According to an embodiment, the receiver and the speaker may be either integrally or separately implemented.

The display device 160 may visually provide information to the outside (e.g., the user) of the electronic device 101. For example, the display device 160 may include a display, a hologram device, or a projector and a control circuit for controlling a corresponding device. According to an embodiment, the display device 160 may include a touch circuitry configured to sense the touch or a sensor circuit (e.g., a pressure sensor) for measuring an intensity of pressure on the touch.

The audio module 170 may convert a sound and an electrical signal in dual directions. According to an embodiment, the audio module 170 may obtain the sound through the input device 150 or may output the sound through an external electronic device (e.g., the electronic device 102 (e.g., a speaker or a headphone)) directly or wirelessly connected to the sound output device 155 or the electronic device 101.

The sensor module 176 may generate an electrical signal or a data value corresponding to an operating state (e.g., power or temperature) inside or an environmental state outside the electronic device 101. The sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support one or more designated protocols to allow the electronic device 101 to connect directly or wirelessly to the external electronic device (e.g., the electronic device 102). According to an embodiment, the interface 177 may include, for example, a high-definition multimedia interface (HDMI), a universal serial bus (USB) interface, an SD card interface, or an audio interface.

A connecting terminal 178 may include a connector that physically connects the electronic device 101 to the external electronic device (e.g., the electronic device 102). According to an embodiment, the connecting terminal 178 may include, for example, an HDMI connector, a USB connector, a secure digital (SD) card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. According to an embodiment, the haptic module 179 may include, for example, a motor, a piezoelectric element, or an electric stimulator.

The camera module 180 may shoot a still image or a video image. According to an embodiment, the camera module 180 may include, for example, at least one or more lenses, image sensors, image signal processors, or flashes.

The power management module 188 may manage power supplied to the electronic device 101. According to an embodiment, the power management module 188 may be implemented as at least a part of a power management integrated circuit (PMIC).

The battery 189 may supply power to at least one component of the electronic device 101. According to an embodiment, the battery 189 may include, for example, a non-rechargeable (primary) battery, a rechargeable (secondary) battery, or a fuel cell.

The communication module 190 may establish a direct (e.g., wired) or wireless communication channel between the electronic device 101 and the external electronic device (e.g., the electronic device 102, the electronic device 104, or the server 108) and support communication execution through the established communication channel. The communication module 190 may include at least one communication processor operating independently from the processor 120 (e.g., the application processor) and supporting the direct (e.g., wired) communication or the wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication module). The corresponding communication module among the above communication modules may communicate with the external electronic device through the first network 198 (e.g., the short-range communication network such as a Bluetooth, a WiFi direct, or an infrared data association (IrDA)) or the second network 199 (e.g., the long-distance wireless communication network such as a cellular network, an internet, or a computer network (e.g., LAN or WAN)). The above-mentioned various communication modules may be implemented into one component (e.g., a single chip) or into separate components (e.g., chips), respectively. The wireless communication module 192 may identify and authenticate the electronic device 101 using user information (e.g., international mobile subscriber identity (IMSI)) stored in the subscriber identification module 196 in the communication network, such as the first network 198 or the second network 199.

The antenna module 197 may transmit or receive a signal or power to or from the outside. According to an embodiment, the antenna module 197 may be formed of a conductor or a conductive pattern. In another embodiment, the antenna module 197 may include other part (e.g., a radio frequency integrated circuit (RFIC)) in addition to the conductor or the conductive pattern. According to an embodiment, the antenna module 197 may include one or more antennas. For example, the communication module 190 may select one antenna suitable for a communication method used in the communication network such as the first network 198 or the second network 199. The signal or power may be transmitted or received between the communication module 190 and the external electronic device through the selected one antenna.

At least some components among the components may be connected to each other through a communication method (e.g., a bus, a general purpose input and output (GPIO), a serial peripheral interface (SPI), or a mobile industry processor interface (MIPI)) used between peripheral devices to exchange signals (e.g., a command or data) with each other.

According to an embodiment, the command or data may be transmitted or received between the electronic device 101 and the external electronic device 104 through the server 108 connected to the second network 199. Each of the electronic devices 102 and 104 may be the same or different types as or from the electronic device 101. According to an embodiment, all or some of the operations performed by the electronic device 101 may be performed by one or more external electronic devices among the external electronic devices 102, 104, or 108. For example, when the electronic device 101 performs some functions or services automatically or by request from a user or another device, the electronic device 101 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 101. The electronic device 101 may provide the result as is or after additional processing as at least a part of the response to the request. To this end, for example, a cloud computing, distributed computing, or client-server computing technology may be used.

Figure 2:
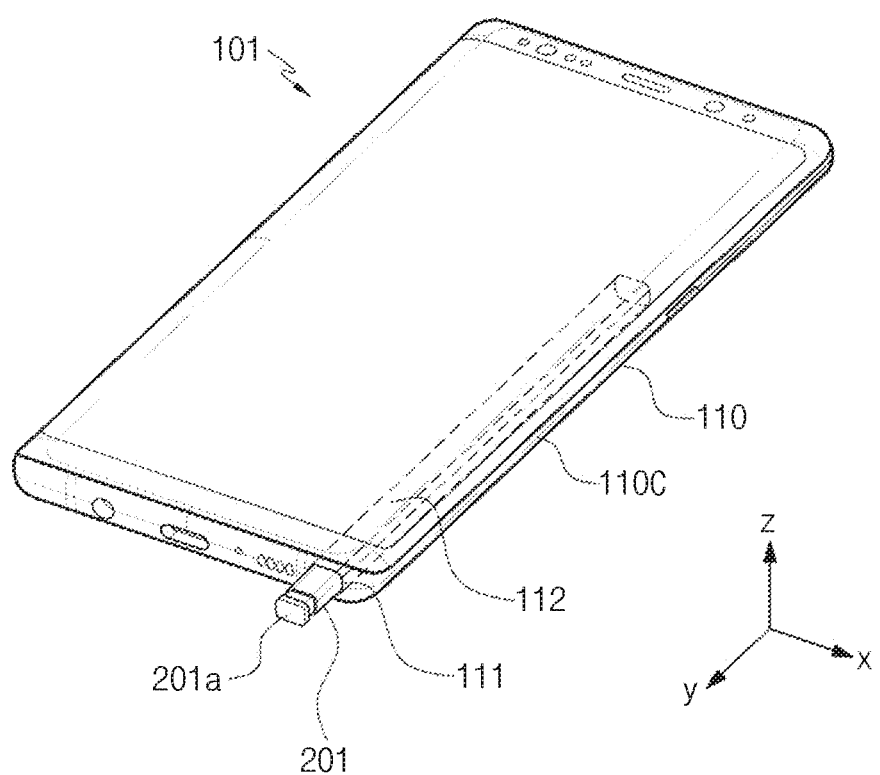
FIG. 2 is a perspective view of an electronic device including a digital pen (or a stylus pen) according to an embodiment of the disclosure.

FIG. 2 is a perspective view of an electronic device including a digital pen (or a stylus pen) according to an embodiment of the disclosure.

Referring to FIG. 2, the electronic device 101 according to an embodiment may include the configuration shown in FIG. 1, and may include a structure in which a digital pen 201 (e.g., a stylus pen) is inserted. The electronic device 101 may include a housing 110 and a portion of the housing, for example, a portion of a side surface 110C may include a hole 111. The electronic device 101 may include a containing space 112 connected to the hole 111, and the digital pen 201 may be inserted into the containing space 112. According to the illustrated embodiment, the digital pen 201 may include a pressable button 201a at one end to facilitate removal of the digital pen 201 from the containing space 112 of the electronic device 101. When the button 201a is pressed, a resilience mechanism (e.g., at least one spring) configured in association with the button 201a may operate to release the digital pen 201 from the containing space 112.

Figure 3:
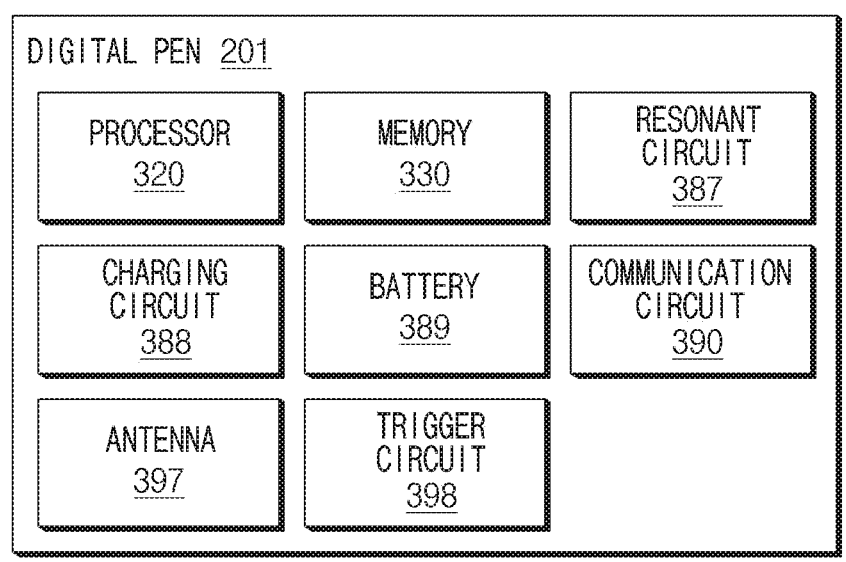
FIG. 3 is a block diagram illustrating a digital pen according to an embodiment of the disclosure.

FIG. 3 is a block diagram illustrating a digital pen according to an embodiment of the disclosure.

Referring to FIG. 3, the digital pen 201 according to an embodiment may include a processor 320, a memory 330, a resonant circuit 387, a charging circuit 388, a battery 389, a communication circuit 390, an antenna 397, and a trigger circuit 398. In an embodiment, the processor 320, at least a portion of the resonant circuit 387, and/or at least a portion of the communication circuit 390 of the digital pen 201 may be configured on a printed circuit board or in a chip form. The processor 320, the resonant circuit 387 and/or the communication circuit 390 may be electrically connected to the memory 330, the charging circuit 388, the battery 389, the antenna 397, or the trigger circuit 398. The digital pen 201 according to an embodiment may be composed of only a resonant circuit and a button.

The processor 320 may include a customized hardware module or a generic processor configured to execute software (e.g., an application program). The processor may include a hardware component (function) including at least one of various sensors provided in the digital pen 201, a data measurement module, an input/output interface, a module for managing a state or environment of the digital pen 201, or a communication module, or a software element (program). For example, the processor 320 may include one of hardware, software or firmware, or a combination thereof. According to an embodiment, the processor 320 may receive a proximity signal corresponding to an electromagnetic field signal generated from the digitizer of the electronic device 101 through the resonant circuit 387. When the proximity signal is identified, the resonant circuit 387 may be controlled to transmit an electro-magnetic resonance (EMR) input signal to the electronic device 101.

The memory 330 may store information related to the action of the digital pen 201. For example, the information may include information for communication with the electronic device 101 and frequency information related to an input action of the digital pen 201.

The resonant circuit 387 may include at least one of a coil, an inductor, or capacitor. The resonant circuit 387 may be used to allow the digital pen 201 to generate a signal including a resonance frequency. For example, to generate the signal, the digital pen 201 may use at least one of an EMR scheme, an active electrostatic (AES) scheme, or an electrically coupled resonance (ECR) scheme. When the digital pen 201 transmits a signal in the EMR scheme, the digital pen 201 may generate a signal including a resonance frequency based on an electromagnetic field generated from an inductive panel of the electronic device 101. When the digital pen 201 transmits a signal in the AES scheme, the digital pen 201 may generate a signal by using capacity coupling with the electronic device 101. When the digital pen 201 transmits a signal in the ECR scheme, the digital pen 201 may generate a signal including a resonance frequency based on an electric field generated from a capacitive device of the electronic device. According to an embodiment, the resonant circuit 387 may be used to change the intensity or frequency of the electromagnetic field corresponding to the manipulating state of the user. For example, the resonant circuit 387 may provide a frequency for recognizing a hovering input, a drawing input, a button input, or an erasing input.

When the charging circuit 388 is connected to the resonant circuit 387 based on a switching circuit, the charging circuit 388 may rectify a resonance signal generated from the resonant circuit 387 into a direct current (DC) signal and provide the DC signal to the battery 389. According to an embodiment, the digital pen 201 may identify whether the digital pen 201 is inserted into the electronic device 101, by using a voltage level of the DC signal sensed by the charging circuit 388.

The battery 389 may be configured to store power required for operation of the digital pen 201. For example, the battery may include a lithium-ion battery or a capacitor, and may be rechargeable or interchangeable. According to an embodiment, the battery 389 may be charged by using the power (e.g., a DC signal (DC power)) supplied from the charging circuit 388.

The communication circuit 390 may be configured to perform a wireless communication function between the digital pen 201 and the communication module 190 of the electronic device 101. According to an embodiment, the communication circuit 390 may transmit state information and input information of the digital pen 201 to the electronic device 101 by using a local area communication scheme. For example, the communication circuit 390 may transmit direction information (e.g., motion sensor data) of the digital pen 201 obtained through the trigger circuit 398, voice information input through a microphone, or information about the remaining amount of the battery 389 to the electronic device 101. For example, the short-range communication scheme may include at least one of Bluetooth, a Bluetooth low energy (BLE), or a wireless LAN.

The antenna 397 may be used to transmit a signal or power to an outside (e.g., the electronic device 101) or to receive the signal or power from the outside. According to an embodiment, the digital pen 201 may include a plurality of antennas 397 from which at least one antenna 397 may be selected that is suitable for the communication scheme. Through the at least one antenna 397 selected, the communication circuit 390 may exchange signals or power with an external electronic device.

The trigger circuit 398 may include at least one button or a sensor circuit. According to an embodiment, the processor 320 may identify the input scheme (e.g., touching or pressing) or type (e.g., an EMR button or a BLE button) of the button of the digital pen 201. According to an embodiment, the sensor circuit may generate an electrical signal or data value corresponding to an internal operating state of the digital pen 201 or an external environmental condition. For example, the sensor circuit may include at least one of a motion sensor, a remaining battery level sensor, a pressure sensor, an optical sensor, a temperature sensor, a geomagnetic sensor, and a biosensor. According to an embodiment, the trigger circuit 398 may transmit a trigger signal to the electronic device 101 by using an input signal of the button or a signal through the sensor.

Figure 4:
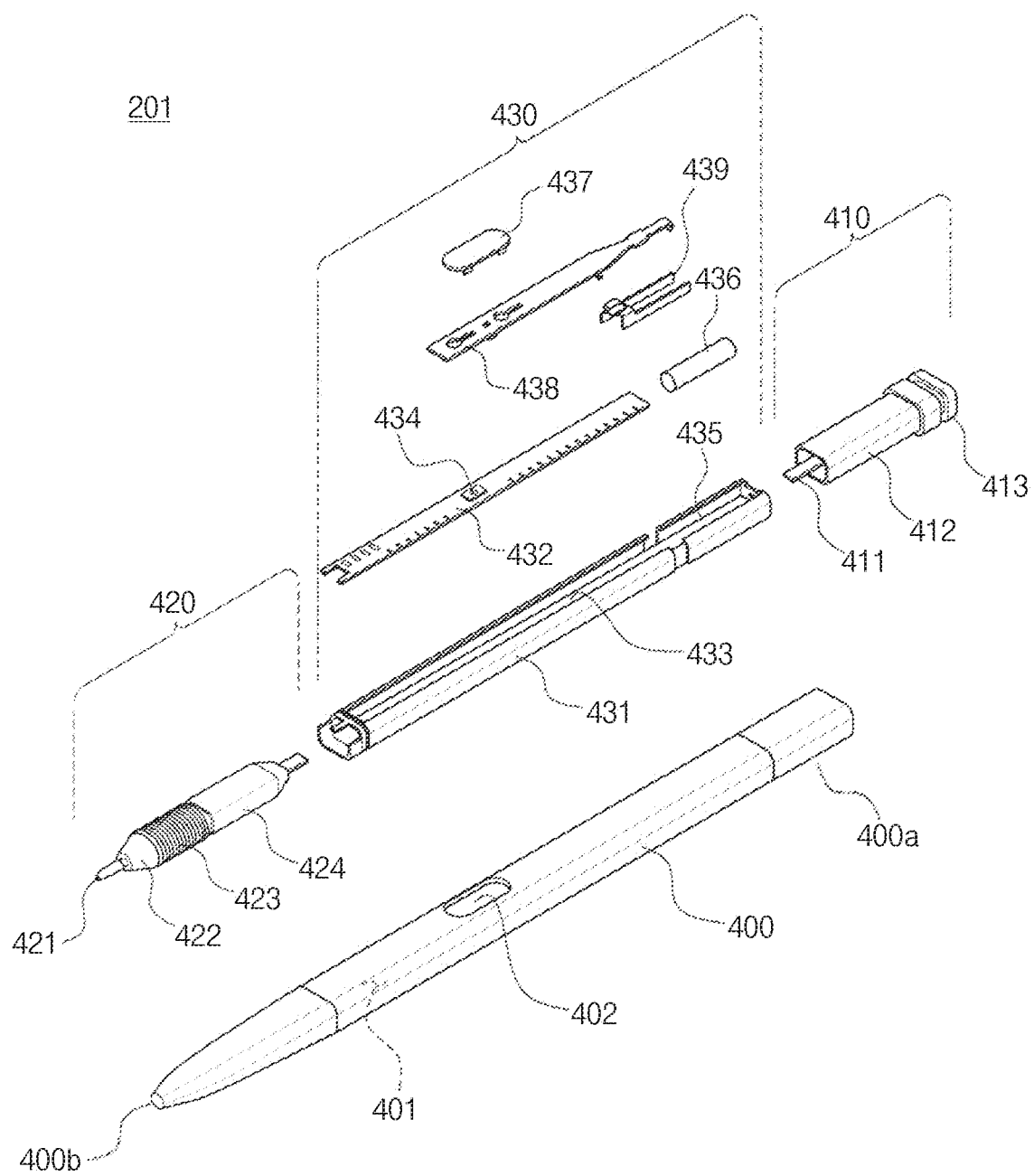
FIG. 4 is an exploded perspective view of a digital pen according to an embodiment of the disclosure.

FIG. 4 is an exploded perspective view of a digital pen according to an embodiment of the disclosure.

Referring to FIG. 4, the digital pen 201 may include a pen housing 400 constituting the outer appearance of the digital pen 201 and an inner assembly inside the pen housing 400. In the illustrated embodiment, the inner assembly may be inserted into the pen housing 400 in a single assembly operation, including all of the various components mounted within the pen.

The pen housing 400 may include a shape elongated between a first end 400a and a second end 400b and may include a containing space 401 therein. The pen housing 400 may have an elliptical shape having a section of a long axis and a short axis, and may be formed as an elliptical pole as a whole. The containing space 112 of the electronic device 501 may have a section having an elliptical shape corresponding to the shape of the pen housing 400. The pen housing 400 may include a synthetic resin (e.g., plastic) material and/or a metallic material (e.g., aluminum). According to an embodiment, the second end 400b of the pen housing 400 may be formed of a synthetic resin material.

The inner assembly may have a shape elongated corresponding to the shape of the pen housing 400. The inner assembly may be roughly divided into three configurations in a longitudinal direction. For example, the inner assembly may include an ejection member 410 arranged at a position corresponding to the first end 400a of the pen housing 400, a coil portion 420 arranged at a position corresponding to the second end 400b of the pen housing 400, and a circuit board portion 430 arranged at a position corresponding to the body of the housing.

The ejection member 410 may include a configuration for ejecting the digital pen 201 from the containing space 112 of the electronic device 501. According to an embodiment, the ejection member 410 may include a shaft 411, an ejection body 412 arranged around the shaft 411 and constituting an entire outer appearance of the ejection member 410, and a button portion 413. When the inner assembly is completely inserted into the pen housing 400, a portion including the shaft 411 and the ejection body 412 may be surrounded by the first end 400a of the pen housing 400, and the button portion 413 (e.g., 201a of FIG. 2) may be exposed to an outside of the first end 400a. In the ejection body 412, a plurality of components (not shown), for example, cam members or elastic members, may be arranged to form a push-pull structure. In an embodiment, the button portion 413 may be substantially coupled to the shaft 411 and may reciprocate linearly with respect to the ejection body 412. According to various embodiments, the button portion 413 may include a button having a latching structure for allowing the user to eject the digital pen 201 using a nail. According to an embodiment, the digital pen 201 may include a sensor that detects a linear reciprocating motion of the shaft 411, thereby providing another input scheme.

When the inner assembly is completely inserted into the pen housing 400, the coil portion 420 may include a pen tip 421 exposed to the outside of the second end 400b, a packing ring 422, a multi-turn coil 423, and/or a writing pressure sensing unit 424 for obtaining a change in pressure due to the pressing of the pen tip 421. The packing ring 422 may include epoxy, rubber, urethane, or silicone. The packing ring 422 may be provided for the purpose of waterproofing and dustproofing and may protect the coil portion 420 and the circuit board portion 430 from flooding or dust. According to an embodiment, the coil 423 may form a resonance frequency (e.g., 500 kHz) at a set frequency band and may be combined with at least one device (e.g., a capacitive element) to adjust the resonance frequency formed by the coil 423 in a specified range.

The circuit board portion 430 may include a printed circuit board 432, a base 431 surrounding at least one surface of the printed circuit board 432, and an antenna. According to an embodiment, a substrate placing portion 433 on which the printed circuit board 432 is arranged is formed on an upper surface of the base 431, and the printed circuit board 432 is fixedly placed on the substrate placing portion 433. According to an embodiment, the printed circuit board 432 may include upper and lower surfaces, where a variable capacitance capacitor or a switch 434 connected to the coil 423 may be arranged on the upper surface, and a charging circuit, a battery or a communication circuit may be arranged on the lower surface. The battery may include an electric double layered capacitor (EDLC). The charging circuit is located between the coil 423 and the battery, and may include a voltage detector circuitry and a rectifier.

The antenna may include an antenna structure 439 such as an example illustrated in FIG. 4 and/or an antenna embedded in the printed circuit board 432. According to various embodiments, the switch 434 may be provided on the printed circuit board 432. A side button 437 provided in the digital pen 201 may be used to press the switch 434 and may be exposed to an outside through a side opening 402 of the pen housing 400. While being supported by a support member 438, when an external force acting on the side button 437 is removed, the support member 438 may provide an elastic restoring force, so that the side button 437 is restored or maintained into a state where the side button 437 is arranged at a specified portion.

The circuit board portion 430 may include another packing ring such as an O-ring. For example, an O-ring made of an elastic material may be arranged on both ends of the base 431 to form a sealing structure between the base 431 and the pen housing 400. In an embodiment, the support member 438 may partially contact the inner wall of the pen housing 400 around the side opening 402 to form a sealing structure. For example, the circuit board portion 430 may form a waterproof and dustproof structure similar to that of the packing ring 422 of the coil portion 420.

The digital pen 201 may include a battery mounting portion 435, on which a battery 436 is arranged, on an upper surface of the base 431. For example, the battery 436, which may be mounted on the battery mounting portion 435, may include a cylinder-type battery.

The digital pen 201 may include a microphone (not shown). The microphone may be directly connected to the printed circuit board 432 or may be connected to a separated flexible printed circuit board (FPCB) (not shown) connected to the printed circuit board 432. According to various embodiments, the microphone may be arranged at a position parallel to the side button 437 in the longitudinal direction of the digital pen 201.

Figure 5:
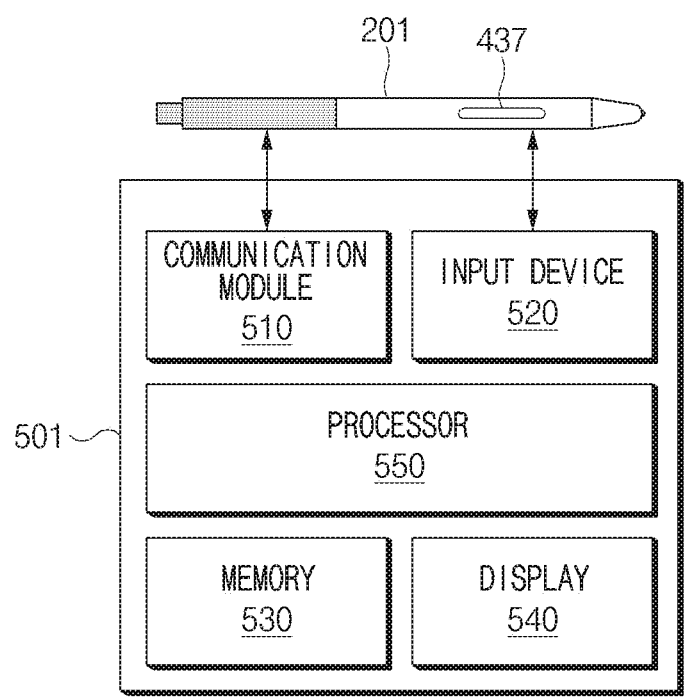
FIG. 5 is a block diagram illustrating a configuration of an electronic device according to an embodiment of the disclosure.

FIG. 5 is a block diagram illustrating a configuration of an electronic device according to various embodiments of the disclosure.

Referring to FIG. 5, the electronic device 501 (e.g., the electronic device 101 of FIG. 1) may include the communication module 510 (e.g., the wireless communication module 192 of FIG. 1), the input device 520 (e.g., the input device 150 of FIG. 1), the memory 530 (e.g., the memory 130 of FIG. 1), a display 540 (e.g., the display device 160 of FIG. 1), and the processor 550 (e.g., the processor 120 of FIG. 1). The configuration of the electronic device 501 is not limited to the above configurations, and may further include the configuration illustrated in FIG. 1.

According to an embodiment, the communication module 510 may include a wireless communication module. The communication module 510 may be connected to the digital pen 201 to transmit or receive data. According to an embodiment, the communication module 510 may support Bluetooth, BLE, or wireless LAN (e.g., Wi-Fi).

According to an embodiment, the input device 520 may receive a user input. The input device 520 may include an inductive panel (not shown) for sensing the position of the digital pen 201.

According to an embodiment, the memory 530 may store at least one app (or an application program). For example, the at least one app may include a camera app for controlling a plurality of cameras (e.g., the camera module 180 of FIG. 1), a presentation app for performing a presentation function, a media app for controlling media contents, a gallery app for displaying an image stored in the memory 530 on the display 540, and the like. According to an embodiment, the memory 530 may store contents to be provided to the user. For example, the contents may be media contents including at least one of an image or sound.

According to an embodiment, the display 540 may output an image. For example, the display 540 may display an image included in the contents, a graphic user interface (GUI) of an executed app, and the like. According to an embodiment, the display 540 may include a panel for receiving a user input using the digital pen 201. The user input may include a contactless input such as a hovering input as well as a touch input.

According to an embodiment, the processor 550 may control the overall operation of the electronic device 501.

According to an embodiment, when the instructions stored in the memory 530 are executed, the processor 550 may perform the operations described below.

According to an embodiment, the processor 550 may execute an application stored in memory 530. The processor 550 may display the GUI of the executed application on the display 540. According to an embodiment, the processor 550 may execute a plurality of apps. The processor 550 may execute one of the plurality of executed apps in the foreground and execute the remaining apps in the background. The processor 550 may display the GUI of the app executing in the foreground on the display 540.

According to an embodiment, the processor 550 may receive a user input using the digital pen 201. According to an embodiment, the processor 550 may recognize the position of the digital pen 201 to receive a user input. For example, the processor 550 may recognize the position at which the digital pen 201 contacts (or touches) through an inductive panel (not shown), or a position at which the digital pen 201 is present (or hovering) within a specified distance, thereby receiving the user input. For example, the input using the position of the digital pen 201 may be a digitizer input.

According to an embodiment, the processor 550 may receive a user input from the digital pen 201 through the communication module 510. For example, the processor 120 may receive a user input through the side button 437 of the digital pen 201. The processor 550 may receive a signal corresponding to a user input from the digital pen 201 through the communication module 510. For example, the user input through the side button 437 may be a wireless communication input. According to an embodiment, the processor 550 may receive mutually different user inputs through the side button 437 of the digital pen 201. For example, the processor 550 may receive user inputs that differ in the number of times or a time the side button 437 of the digital pen 201 is pressed. In other words, the processor 550 may distinguish mutually different user inputs based on the number of times or the times the side button 437 of the digital pen 201 is pressed. For example, the mutually different user inputs may include inputs of pressing the side button 437 once, twice, for a long time, and the like. According to an embodiment, the processor 550 may receive a signal corresponding to each of the different user inputs from the digital pen 201.

According to an embodiment, the processor 550 may distinguish first and second inputs based on the number of times the side button 437 of the digital pen 201 is pressed on the basis of a specified time. The processor 550 may receive a signal (or an event signal) corresponding to an event of first pressing the side button 437 from the digital pen 201 and recognize the first or second input depending on whether an event (or an event signal) of pressing the side button 437 secondly within a specified time is received. For example, when the processor 550 receives the event of first pressing the side button 437 from the digital pen 201, the processor 550 may suspend the determination as to whether the event is the first input (e.g., an input of pressing the side button 437 of the digital pen 201 once), and may determine (or recognize) the event as the first input when an event of pressing the side button 437 once more within a specified time is not received. In addition, when the processor 550 receives a signal corresponding to an input that presses the side button 437 secondly within a specified time after receiving the event of first pressing the side button 437 from the digital pen 201, the processor 550 may determine the signal as the second input (e.g., an input that presses the side button 437 of the digital pen 201 twice) different from the first input.

According to an embodiment, the digital pen 201 transmits a signal corresponding to an event at the time of releasing or pressing the side button 437, thereby allowing the processor 550 to recognize the second input. For example, the digital pen 201 may transmit a signal at a time point t1 when the side button 437 is first pressed and a signal at a time point t3 when the side button 437 is pressed secondly within a specified time. As another example, the digital pen 201 may transmit a signal at a time t2 when the side button 437 is released, and may transmit a signal at a time t3 when the side button 437 is pressed secondly within a specified time. As still another example, the digital pen 201 may transmit a signal at a time t1 when the side button 437 is first pressed and transmit a signal at a time t4 when the side button 437 is released secondly within a specified time. As still another example, the digital pen 201 may transmit a signal at a time t2 when the side button 437 is first released and transmit a signal at a time t4 when the side button 437 is released secondly within a specified time. Thus, as compared with transmitting signals at both time points when the side button 437 of the digital pen 201 is pressed and released, the consumption of the battery of the digital pen 201 (e.g., the battery 389 of FIG. 3) may be reduced, and by minimizing the interval between the time points when the presses of the button are determined many times, it is possible to respond immediately to the user input (e.g., perform the specified operation). In addition, when any actions for the second input (e.g., the input of pressing the side button 437 of the digital pen 201 twice) are not set to the executed app and the processor 550 first receives a signal corresponding to the first input from the digital pen 201, the processor 550 may determine the signal as the first input (e.g., the input of pressing the side button 437 of the digital pen 201 once) without suspending the determination as to whether the signal is the first input. Thus, by shortening the waiting time (or the determination suspend time) for determining the pressing of the side button 437 many times, it is possible to provide an immediate response to a user input.

According to an embodiment, the processor 550 may perform at least one operation corresponding to each user input received from the digital pen 201. According to an embodiment, the processor 550 may perform an action corresponding to a user input (e.g., a touch input or a hovering input) based on the location of the digital pen 201. For example, the processor 550 may receive an input for selecting an object (e.g., an icon or a virtual button) displayed at a designated position of the GUI by using the digital pen 201, and any perform an operation corresponding to the selected object. According to an embodiment, the processor 550 may perform an operation corresponding to a user input through the side button 437 of the digital pen 201. For example, the processor 550 may receive a signal corresponding to a user input received through the side button 437 of the digital pen 201, and may perform an operation of an app corresponding to the received signal. For example, the operation of the app may be set to be executed when the user input through the side button 437 of the digital pen 201 is received. The app may be an app being executed in the electronic device 501.

According to an embodiment, the processor 550 may display, on the display 540, a function that can be performed using the digital pen 201, and guide information about a controllable operation. For example, the processor 550 may display the guide information on the display 540 when detecting the detachment (or separation) of the digital pen 201. According to an embodiment, the processor 550 may display, on the display 540, the guide information (e.g., first information) about a function that can be performed through a user input (e.g., a touch input, a hovering input) based on the position of the digital pen 201. For example, the first information may include information about a function related to a user input based on the position of the digital pen 201, such as a handwriting memo function, a drawing function, and the like. According to an embodiment, the processor 550 may display, on the display 540, guide information (e.g., second information) about an action controllable through a user input through the side button 437 of the digital pen 201. For example, the second information may include information about the action of the app being executed.

According to an embodiment, the processor 550 may display an object corresponding to the digital pen 201 on the display 540. For example, the processor 550 may display the object on the display device 160 when the digital pen 201 is detached from the electronic device 501. For example, the object may be a floating icon. A function that can be performed using the digital pen 201 while being adjacent to the floating icon, and guide information on a controllable action may be displayed. Thus, the processor 550 may indicate the separated state of the digital pen 201 through the object.

According to an embodiment, the processor 550 may indicate, through the object, a state in which the digital pen 201 is connected to the communication module 510. For example, the processor 550 may change the color of the edge of the object to indicate whether it is in a state capable of through the side button 437 of the digital pen 201.

According to an embodiment, the processor 550 may display, on the display 540, an indicator that indicates the state of the digital pen 201. For example, the processor 550 may display, on the display 540, an indicator that indicates wireless connection state information of the digital pen 201, information about a battery (e.g., the battery 389 of FIG. 3), and the like.

Figure 6A:
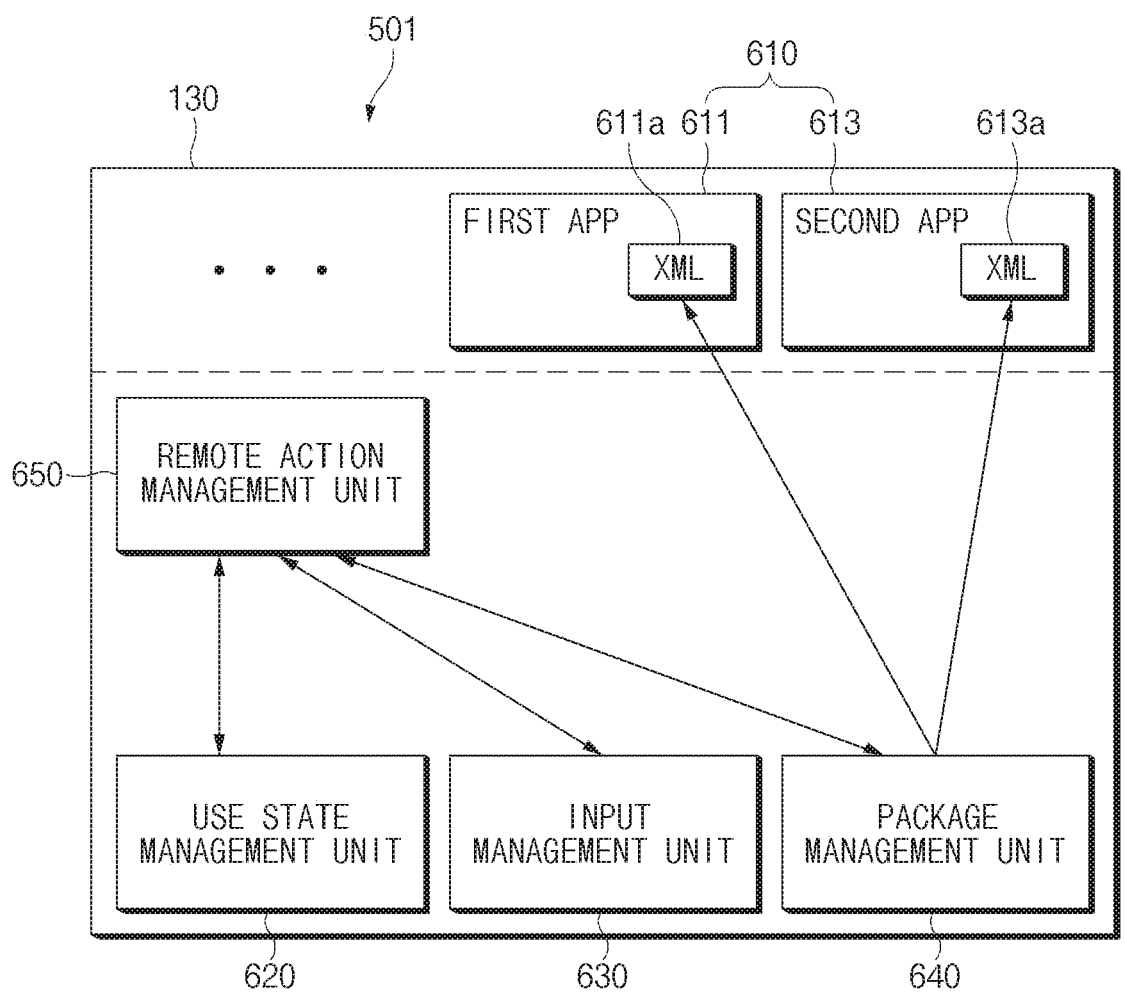
FIG. 6A is a view illustrating a framework and a plurality of apps stored in a memory of an electronic device according to an embodiment of the disclosure.

FIG. 6A is a view illustrating a framework and a plurality of apps stored in a memory of an electronic device according to various embodiments of the disclosure.

Referring to FIG. 6A, the memory 530 of the electronic device 501 may store a plurality of apps 610 and frameworks 620 to 650 for managing the plurality of apps 610.

According to an embodiment, actions (e.g., remote actions) may be defined in extensible markup language (XML) content 611a and 613a. The actions may be executed based on a user input through the side button 437 of a digital pen (e.g., the digital pen 201 of FIG. 5).

According to an embodiment, a user input through the button of the digital pen may be set to correspond to a function performed in at least one app. For example, the user input through the button of the digital pen may be set to correspond to a camera control function performed in at least one app (e.g., B612, Snapchat, Snow). In addition, the user input through the button of the digital pen may be set to correspond to a media control function performed in at least one app (e.g., Google play music, Samsung music, Melon, and the like). For example, the app in which the media control function is performed may be remotely controlled by using the side button 437 of the digital pen 201 even when being executed in the background as well as in the foreground. Thus, the function set to correspond to the user input through the button of the digital pen may be applied to a plurality of apps for performing the function.

For example, each of a plurality of apps 610 may declare an intent filter as following "REMOTE_ACTION' inactivity to process a user input received through the user input received through the side button 437 of the digital pen 201 of the app manifest file (AndroidManifest.xml) included in each app 610 in order to define at least one action corresponding to at least one user input through the side button 437 of the digital pen 201.

```
<intent-filter>
    <action android:name="com.samsung.android.support.
    REMOTE_ACTION" />
</intent-filter>
```

In addition, the XML (or an XML resource) defining at least one action corresponding to at least one user input through the side button 437 of the digital pen 201 may be designated under the activity tag declared as the 'REMOTE_ACTION' as following meta data.

```
<meta-data    android:name="com.samsung.android.support.
    REMOTE_ACTION"
    android:resource="@xml/remote_action"/>
```

In addition, at least one action corresponding to at least one user input received through the side button 437 of the digital pen 201 may be defined in XML. In other words, the XML may include action information (or key information) corresponding to at least one user input received through the side button 437 of the digital pen 201.

```
<?xml version="1.0" encoding="utf-8"?>
<remote-actions version="1.0">
    <action id="left" label="@string/move_left" priority="1"
        trigger_key="DPAD_LEFT">
    </action>
    <action id="right" label="@string/move_right" priority="2"
        trigger_key="CTRL_LEFT+SHIFT+DPAD_RIGHT">
    </action>
</remote-actions>
```

For example, the actions of following Table 1 may include at least one action that may be executed corresponding to at least one user input (e.g., first to third functions) through the side button 437 of the digital pen 201 for each app 610.

TABLE 1

| App | First function | Second function | Third function |
|---|---|---|---|
| Camera control | Photographing and recording | Camera switching | X |
| Media control | Playback and pause | Skip | X |
| Gallery | Next image | Previous image | X |
| Pen-up | Playback and pause drawing lecture | Skip drawing lecture 10 seconds later | X |
| Voice recorder | Start and stop voice recording | X | X |
| DMB | Next channel (live) Next video (video play) | Previous channel (live) Previous video (video play) | It is possible to provide limited functions to DMB support countries |

For example, the apps 610 installed in the electronic device 501 may define actions corresponding to the types of user inputs that may be received through the side button 437 of the digital pen 201 as following table 2.

TABLE 2

| Category | App name | First input | Second input |
|---|---|---|---|
| Document viewer and editor | MS PPT | Next slide screen | Previous slide screen |
| | Hancom show | Next slide | Previous slide |
| Camera control function | B612 | Photographing | Camera switching |
| | Snapchat | Photographing | Camera switching |
| | Snow | Photographing | Camera switching |
| Media control function | Youtube | Video playback and pause | Next video playback |
| | Gallery | Next image | Previous image |

According to an embodiment, the memory 530 may store, as a framework for controlling the actions of the executed apps 611 and 613, a use state management unit 620, an input management unit 630, a package management unit 640, and a remote action management unit 650. According to an embodiment, the use state management unit 620, the input management unit 630, the package management unit 640, and the remote action management unit 650 may be executed by the processor 550 of the electronic device 501 and perform following actions.

According to an embodiment, the use state management unit 620 may manage the execution states of the apps 611 and 613. For example, the use state management unit 620 may determine the priority for processing information of the apps 611 and 613 based on a user input and state information of the apps 611 and 613 executed in the foreground and background. According to an embodiment, the use state management unit 620 may provide information about the execution state of the apps 611 and 613. For example, the use state management unit 620 may provide information related to the apps 611 and 613 executed in the foreground and background.

According to an embodiment, the input management unit 630 may transmit a message for performing a specified action to the apps 611 and 613 based on the occurrence of an event. For example, the input management unit 630 may transmit a message (or a key information message) for performing a selected action (or a remote action) based on a user input received via the side button 437 of the digital pen 201 to the apps 611 and 613.

According to an embodiment, the package management unit 640 may manage information about the installed apps 611 and 613. According to an embodiment, the package management unit 640 may manage key information about at least one of the apps 610. When the apps 611 and 613 are installed or at least one action corresponding to at least one user input through the side button 437 of the digital pen 201 is defined, the package management unit 640 may obtain key information about the at least one action defined. The package management unit 640 may store the obtained key information in the memory 130 together with the information about the apps 611 and 613.

According to an embodiment, the remote action management unit 650 can obtain state information of the apps 611 and 613 that are being executed, through the use state management unit 620. For example, the remote action management unit 650 may receive the information about the apps 611 and 613 being executed in the foreground and background and the switching information of the apps 611 and 613 being executing in the foreground, through the use state management unit 620.

According to an embodiment, the remote action management unit 650 may obtain action information defined in the apps 611 and 613 by which an action (or a remote action)

selected based on a user input received through the package management unit 640 is performed. According to an embodiment, the remote action management unit 650 may provide the obtained at least one action information to the user. For example, the remote action management unit 650 may display the obtained action information adjacent to an object (e.g., a floating icon) displayed on the display 540. In addition, the remote action management unit 650 may display, on the object, information about whether a user input is received through the side button 437 of the digital pen 201.

According to an embodiment, the remote action management unit 650 can transmit a key information message to the apps 611 and 613 that are to perform a remote action through the input management unit 630.

For example, the electronic device 501 receives a user input (or first input) (e.g., an input that pushes the side button 437 once) through the side button 437 of the digital pen 201 (first operation) while the first app 611 is being executed (first operation). The electronic device 501 may receive a first input through the side button 437 from the digital pen 201 through the communication module 510. The electronic device 501 may perform a first action of the first app 611 being executed in response to the received first input. Thus, the electronic device 501 may display a GUI associated with the first action of the first app 611 on the display 540.

In addition, the electronic device 501 may receive a user input through the side button 437 of the digital pen 201 while the second app 613 is executed (a second operation). The electronic device 501 may receive a user input through the side button 437 from the digital pen 201 through the communication module 510. The received user input may be the same kind of input as the first input received in the first operation. The electronic device 501 may perform a first action of the second app 613 being executed in response to the received user input. For example, the first action of the second app 613 may be an action different from the first action of the first app 611. In other words, even though the electronic device 501 receives the same user input through the side button 437 of the digital pen 201 when the second app 613 is executed, the electronic device 501 may perform an action different from that while the first app 611 is executed. Thus, the electronic device 501 may display, on the display 540, the GUI related to the first action of the second app 613.

As another example, the electronic device 501 may receive a user input (or the second input) (e.g., an input that presses a button twice) through the side button 437 of the digital pen 201 while the first app 611 is executed (the first operation). The electronic device 501 may receive the second input through the button from the digital pen 201 through the communication module 510. The electronic device 501 may perform the second action of the first app 611 being executed, in response to the received second input. Thus, the electronic device 501 may display the GUI related to the second action of the first app 611 on the display 540.

In addition, the electronic device 501 may receive a user input through the side button 437 of the digital pen 201 while the second app 613 is executed (the second operation). The electronic device 501 may receive the user input through the side button 437 from the digital pen 201 through the communication module 510. The received user input may be the same kind of input as that of the second input received in the first operation. In response to the received user input, the electronic device 501 may perform a second action of the second app 613 being executed. For example, even though the electronic device 501 receives the same user input through the side button 437 of the digital pen 201 when the second app 613 is executed, the electronic device 501 may perform an action different from that while the first app 611 is executed. Thus, the electronic device 501 may display, on the display 540, the GUI related to the second action of the second app 613.

Figure 6B:
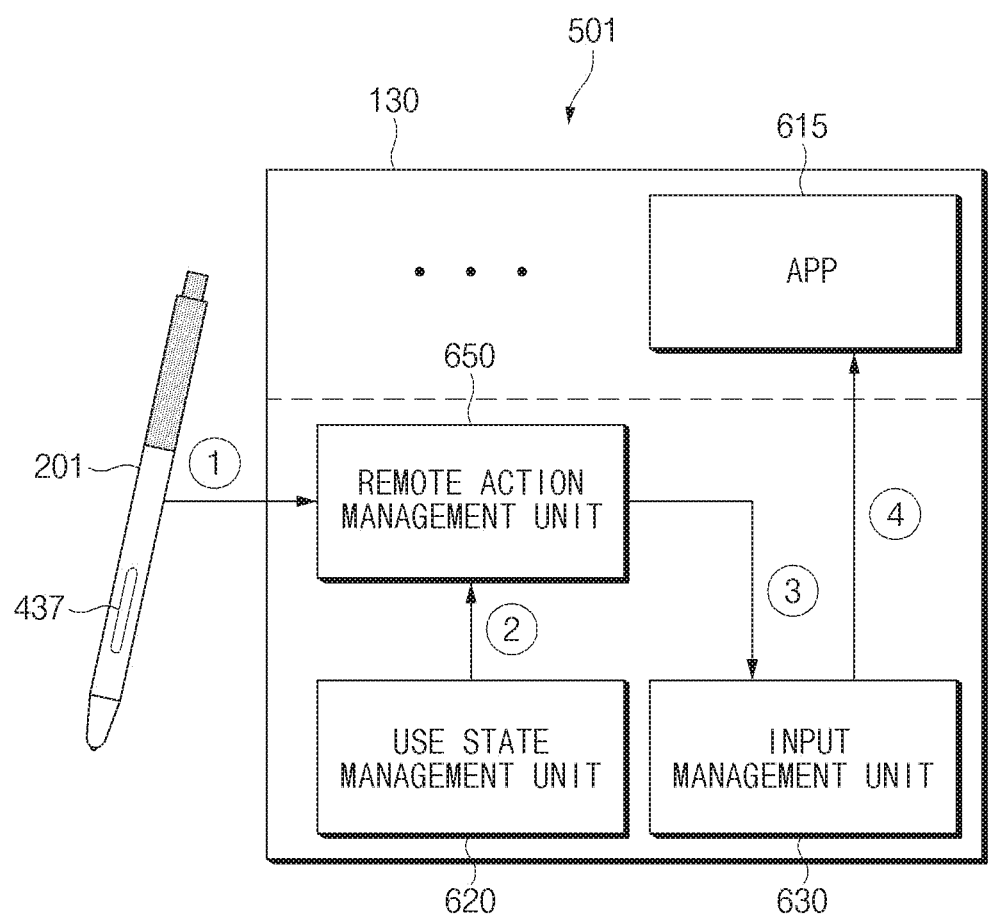
FIG. 6B is a view illustrating an action when an electronic device receives a user input through a button of a digital pen according to an embodiment of the disclosure.

FIG. 6B is a view illustrating an action when an electronic device receives a user input through a button of a digital pen according to an embodiment of the disclosure.

Referring to FIG. 6B, the electronic device 501 may perform an action corresponding to a user input received through the side button 437 of the digital pen 201 based on an app 615 being executed.

According to an embodiment, in operation 1, the remote action management unit 650 of the electronic device 501 may receive at least one user input through the side button 437 of the digital pen 201 through the communication module 510. For example, the remote action management unit 650 may receive a signal corresponding to at least one user input from the digital pen 201.

According to an embodiment, in operation 2, when the remote action management unit 650 receives the at least one user input, the remote action management unit 650 may obtain the execution state information of the app 615 through the use state management unit 620. In other words, the remote action management unit 650 may identify the app being executed through the use state management unit 620. According to an embodiment, the remote action management unit 650 may detect the detachment of the digital pen 201 and receive the execution state information of the app 615 in response to the detection. According to an embodiment, the remote action management unit 650 may provide, to the user, guide information for at least one selected action of the app 615 corresponding to at least one user input received through the side button 437 of the digital pen 201.

According to an embodiment, in operation 3, the remote action management unit 650 may transmit a key information message to the input management unit for performing a specified action. In response, in operation 4, the input management unit 630 transmits information to the app 615 to perform the specified action based on the execution state information of the app 610 obtained through the input management unit 630. Thus, the electronic device 501 may perform the specified action of the app 615.

Figure 7:
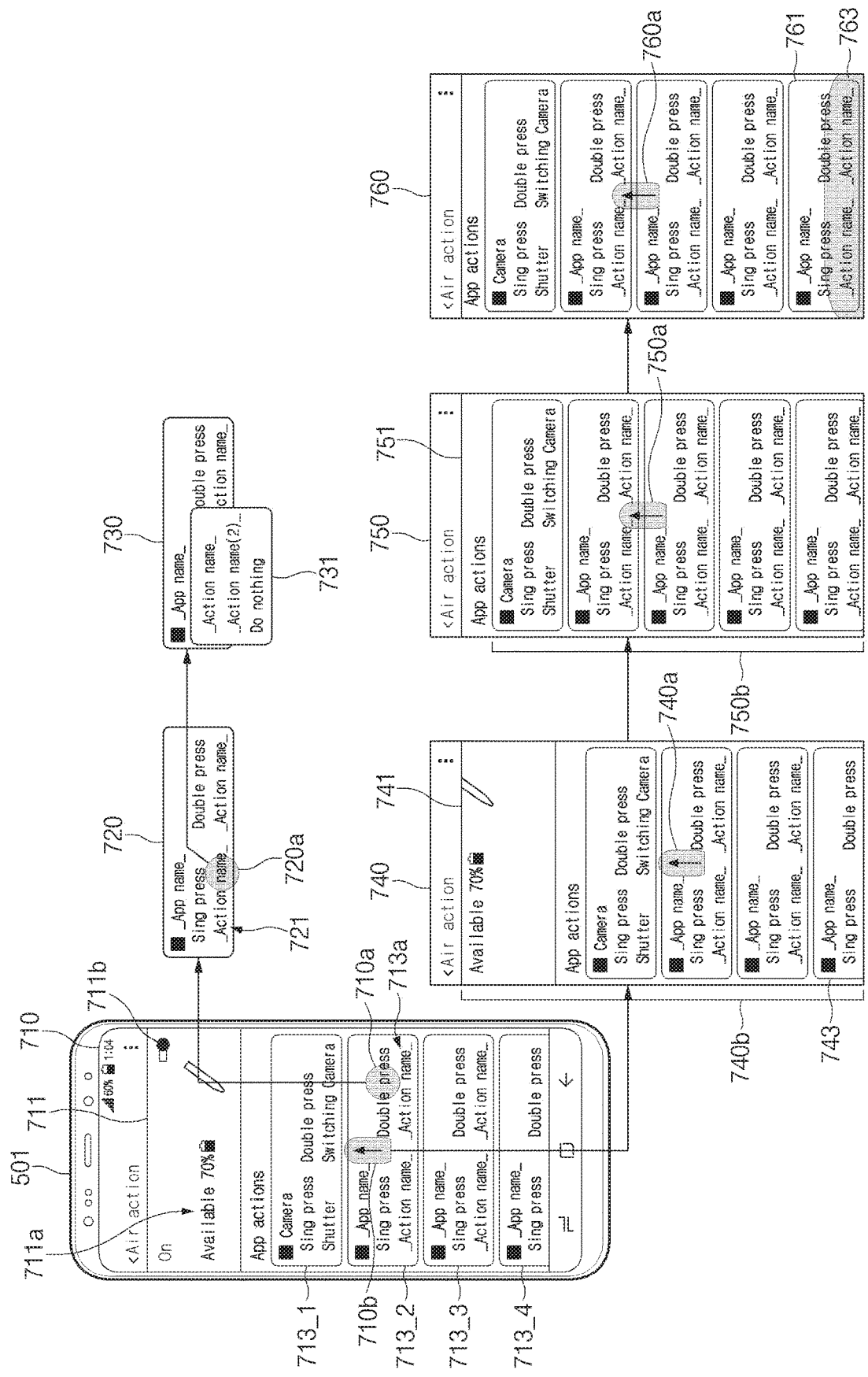
FIG. 7 is a view illustrating a screen for providing a list of apps to which an action corresponding to a user input through a button of a digital pen of an electronic device according to an embodiment of the disclosure is set.

FIG. 7 is a view illustrating a screen for providing a list of apps to which an action corresponding to a user input through a button of a digital pen of an electronic device according to an embodiment of the disclosure is set.

Referring to FIG. 7, the electronic device 501 may provide, to a user, a list 700 of settable apps (e.g., the plurality of apps 610 of FIG. 6A) by at least one action which corresponds to at least one user input through the side button 437 of the digital pen 201.

According to an embodiment, in a screen 710, the electronic device 501 may provide state information 711 of a digital pen (e.g., the digital pen 201 of FIG. 5). For example, the electronic device 501 may provide information 711a about the battery 389 of the digital pen 201. The electronic device 501 may receive a user input for connecting with the digital pen through an activation button 711b and turning on or off a control function by the side button 437 of the digital pen 201.

According to an embodiment, in the screen 710, the electronic device 501 may provide a list 713 of at least settable app 713 corresponding to at least one user input received through a button (e.g., the side button 437 in FIG.

5) of the digital pen 201. For example, the list 713 of the apps 613 may include information 713a about at least one action corresponding to each of at least one user input for each installed app 613. According to an embodiment, the electronic device 501 may update the list 713 of the apps 613. For example, the electronic device 501 may add a newly installed app to the list 713 of the apps 613. According to an embodiment, the electronic device 501 may activate or deactivate an action set through the items 713_1, 713_2, 713_3, and 713_4 included in the list 713 of the app 613.

According to an embodiment, the electronic device 501 may deactivate the action set to each app based on an average use time of each app included in the list 713 of the apps 610. For example, the electronic device 501 may deactivate an action set to an app whose the average use time is longer than the operable time (or a threshold time) of the digital pen 201 based on the remaining amount of the battery 389 of the digital pen 201. According to an embodiment, when deactivating the action set to the app, the electronic device 501 may provide a pop-up window to receive a user input for deactivating the set action. The electronic device 501 may deactivate the set action when receiving the user input. According to an embodiment, the electronic device 501 may provide a guide for inducing the user to charge the battery 389 of the digital pen 201. According to an embodiment, the electronic device 501 may check the use time of the app to be executed every time when the app is executed, and calculate the average use time of the executed app based on the confirmed use time.

According to an embodiment, in the screen 710, the electronic device 501 may receive a selection input 710a that selects an app for setting at least one action corresponding to at least one user input. According to an embodiment, in a screen 720, the electronic device 501 may provide information about the setting of at least one action corresponding to at least one user input received through the side button 437 of the digital pen 201 of the selected app. For example, the electronic device 501 may provide action information 721 set to the first input (e.g., an input of pushing the side button 437 once) and the second input (e.g., an input of pushing the side button 437 twice). According to an embodiment, the electronic device 501 may receive an input 720a of selecting a user input for setting a specified action. According to an embodiment, in a screen 730, the electronic device 501 may provide settable action information 731 for the selected user input.

According to an embodiment, in the screen 710, the electronic device 501 may receive a drag input 710b that scrolls up or down the list 713 of the apps 610. According to an embodiment, in a screen 740, based on the drag input 710b, the electronic device 501 may display sub-items 743 on the display instead of at least a portion of state information 741 of the digital pen 201. The electronic device 501 may again receive a scroll-up drag input 740a. The area capable of receiving the scroll-up drag input 740a may be an entire area 740b of a screen. According to an embodiment, in a screen 750, the electronic device 501 may provide a list 751 of apps through the entire area 740b of the screen. The electronic device 501 may again receive a scroll-up drag input 750a. The area capable of receiving the scroll-up drag input 750a may be an area 750b where items are displayed on the screen. According to an embodiment, in a screen 760, the electronic device 501 may provide the lowest item 761. When the electronic device 501 again receives a scroll-up drag input 760a, the electronic device 501 may display, on the display 540, an indicator 763 of informing that there is no lower item.

Figure 8:
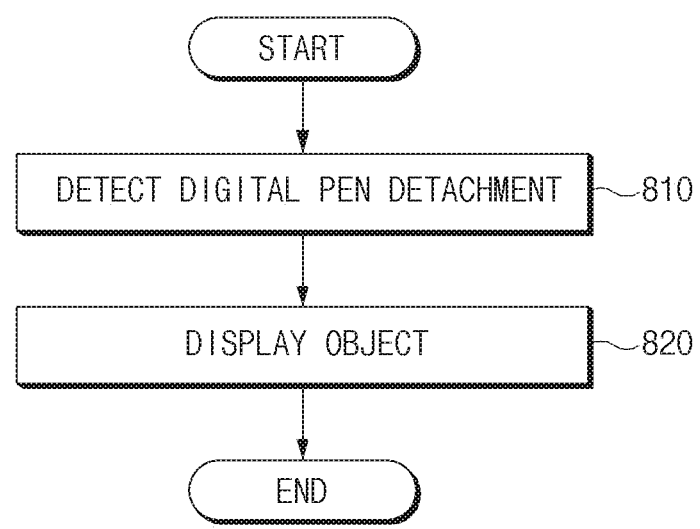
FIG. 8 is a flowchart illustrating a method of displaying on a display an object corresponding to a digital pen of an electronic device according to an embodiment of the disclosure.

FIG. 8 is a flowchart illustrating a method of displaying on a display an object corresponding to a digital pen of an electronic device according to an embodiment of the disclosure.

Referring to FIG. 8, in operation 810, the electronic device 501 may detect the detachment of a digital pen (e.g., the digital pen 201 of FIG. 5). For example, the electronic device 501 may detect that the digital pen 201 is detached from a containing space (e.g., the containing space 112 of FIG. 2) of the electronic device 501.

According to an embodiment, in operation 820, the electronic device 501 may display on the display 540 an object corresponding to the digital pen 201 in response to the detection. The object may be, for example, a floating icon.

Figure 9:
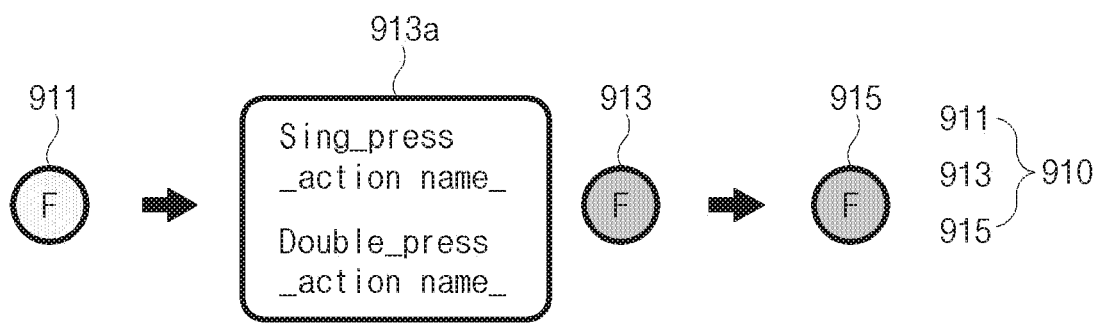
FIG. 9 is a view illustrating an object displayed on a display of an electronic device according to an embodiment of the disclosure.
Figure 9:
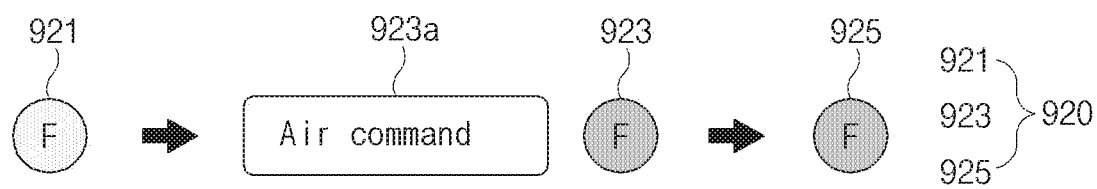
Figure 9:
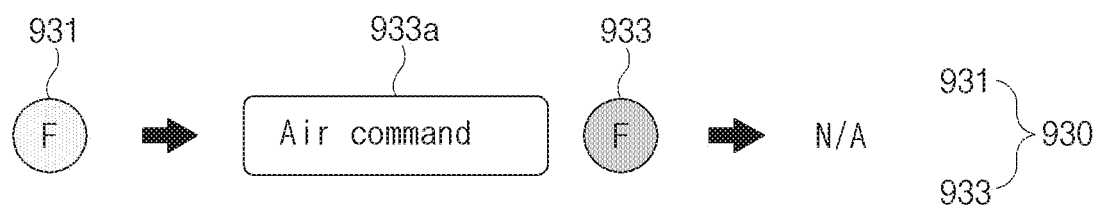

FIG. 9 is a view illustrating an object displayed on a display of an electronic device according to an embodiment of the disclosure.

Referring to FIG. 9, an electronic device (e.g., the electronic device 501 of FIG. 5) may represent, in an object (e.g., a floating icon) 910, 920 and 930 displayed on the display 540, whether at least one operation corresponding to the at least one user input can be performed. In addition, the electronic device 501 may provide guidance information for at least one action corresponding to at least one user input received through the side button 437 of the digital pen 201 adjacent to the object.

Referring to (a) of FIG. 9, the electronic device 501 may display, on the display 540, a floating icon 910 corresponding to the digital pen 201 connected through the communication module 190. The electronic device 501 may perform at least one action corresponding to at least one user input received through the side button 437 of the digital pen 201.

According to an embodiment, the electronic device 501 may display a floating icon 911 on the display 540 when the digital pen 201 is detached. For example, the electronic device 501 may display the floating icon 911 in a first state. The first state may be a grayed state. According to an embodiment, the electronic device 501 may change the edge of the floating icon 910 to a different color (e.g., blue) to represent whether at least one action corresponding to at least one user input received through the side button 437 of the digital pen 201 connected through the wireless communication circuit can be performed.

According to an embodiment, the electronic device 501 may change the state of a floating icon 913 when the digital pen 201 receives an input (e.g., a hovering input) for selecting the floating icon. For example, the electronic device 501 may display the floating icon 913 in the second state. The second state may be a blacked state. According to an embodiment, the electronic device 501 may provide, to a user, guide information 913a for at least one action corresponding to at least one user input received through the side button 437 of the digital pen 201 of the app (e.g., the app 615 of FIG. 6B) being executed. For example, the electronic device 501 may display the guide information 913a adjacent to the floating icon 913. The edge of the guide information 913a may be displayed in a color similar to the edge of the floating icon 913. Thus, the connection state of the digital pen 201 may be more clearly provided to the user.

According to an embodiment, when an app to which an action corresponding to a user input through the side button 437 of the digital pen 201 is set is executed (or first entered), the electronic device 501 may show guide information 913a related to the set action. The electronic device 501 may not display the guide information 913a at the time of a later execution of the action.

According to an embodiment, when the electronic device 501 receives at least one user input through the side button 437 of the digital pen 201, the electronic device 501 may maintain the displaying state of a floating icon 915. For example, the floating icon 915 may be maintained in the second state and the changed state of the edge.

Referring to (b) of FIG. 9, the electronic device 501 may display, on the display 540, a floating icon 920 corresponding to the digital pen 201 connected through the communication module 190. The electronic device 501 may not be able to perform at least one action corresponding to at least one user input received through the side button 437 of the digital pen 201.

According to an embodiment, although the electronic device 501 is wirelessly connected to the digital pen 201, when the user sets the remote action to off, or does not set the remote action to the app being executed in the foreground and background, the electronic device 501 may display, on the display 540, the floating icon 920 whose the edge is not changed in color.

According to an embodiment, when the digital pen 201 is detached, the electronic device 501 may display a floating icon 921 on the display 540. For example, the electronic device 501 may display the floating icon 921 in the first state.

According to an embodiment, when the digital pen 201 receives an input (e.g., a hovering input) for selecting a floating icon, the electronic device 501 may change the state of a floating icon 923 into the second state. According to an embodiment, the electronic device 501 may provide name (e.g., air command) information 923a of the floating icon to the user.

According to an embodiment, when the electronic device 501 receives at least one user input through the side button 437 of the digital pen 201, the displaying state of a floating icon 925 except for the name information 923a may be maintained.

Referring to (c) of FIG. 9, the electronic device 501 may display, on the display 540, a floating icon 930 corresponding to the digital pen 201 which is not connected through the communication module 190.

According to an embodiment, similarly to the action of (b), the electronic device 501 may display a first floating icon 931 in the first state when the digital pen 201 is detached. According to an embodiment, similarly to the action of (b), when the digital pen 201 receives an input (e.g., a hovering input) for selecting a floating icon, the electronic device 501 may change the state of a floating icon 933 to the second state. According to an embodiment, when receiving the input for selecting the floating icon, the electronic device 501 may provide name (e.g., air command) information 933a of the floating icon to the user.

According to an embodiment, when receiving at least one user input through the side button 437 of the digital pen 201, the electronic device 501 may not display the floating icon (N/A).

Figure 10A:
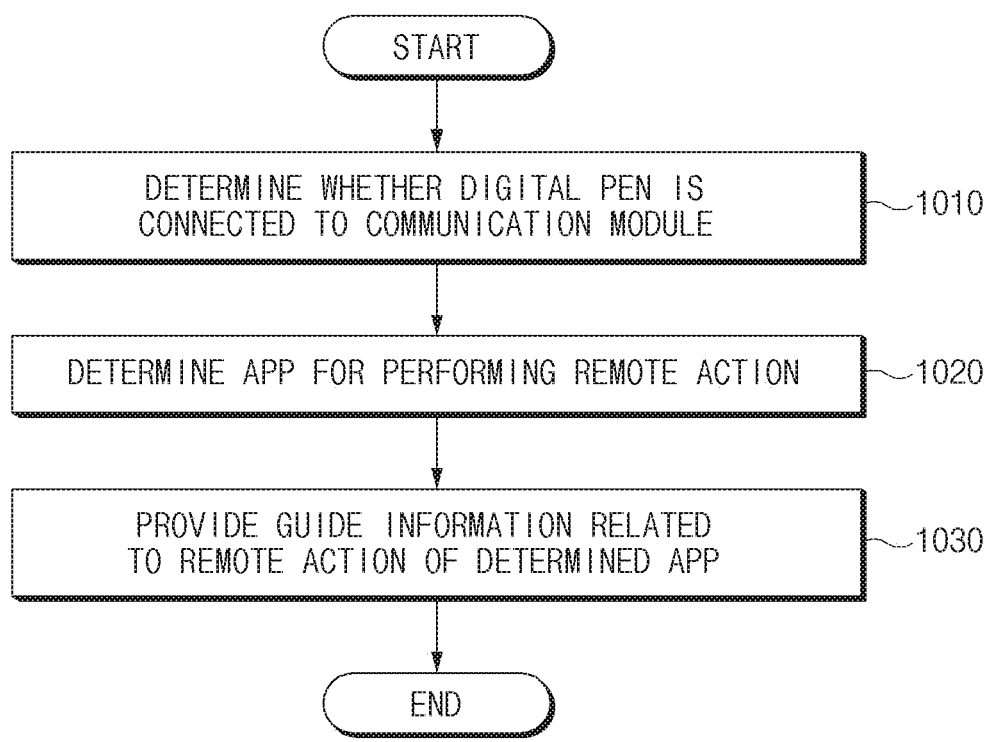
FIG. 10A is a flowchart illustrating a method of providing guidance information by an electronic device according to an embodiment of the disclosure.

FIG. 10A is a flowchart illustrating a method of providing guidance information by an electronic device according to an embodiment of the disclosure.

Referring to FIG. 10A, an electronic device (e.g., the electronic device 501 of FIG. 5) may provide information about an remote action set to an app that performs an action corresponding to at least one user input through the side button 437 of the digital pen 201.

According to an embodiment, in operation 1010, the electronic device 501 may determine whether the digital pen (e.g., the digital pen 201 of FIG. 5) is connected to the communication module 510. For example, the electronic device 501 may determine whether the digital pen 201 is connected to the electronic device 501 through wireless communication.

According to an embodiment, in operation 1020, the electronic device may determine an app for performing an action (or a remote action) corresponding to a user input, among the apps being executed. For example, the user input may be a user input received through the side button 437 of the digital pen 201. The operation 1020 of determining the app for performing an action corresponding to a user input will be described later in detail with reference to FIG. 10B.

According to an embodiment, in operation 1030, the electronic device 501 may provide guidance information related to a remote action set to the determined app.

Figure 10B:
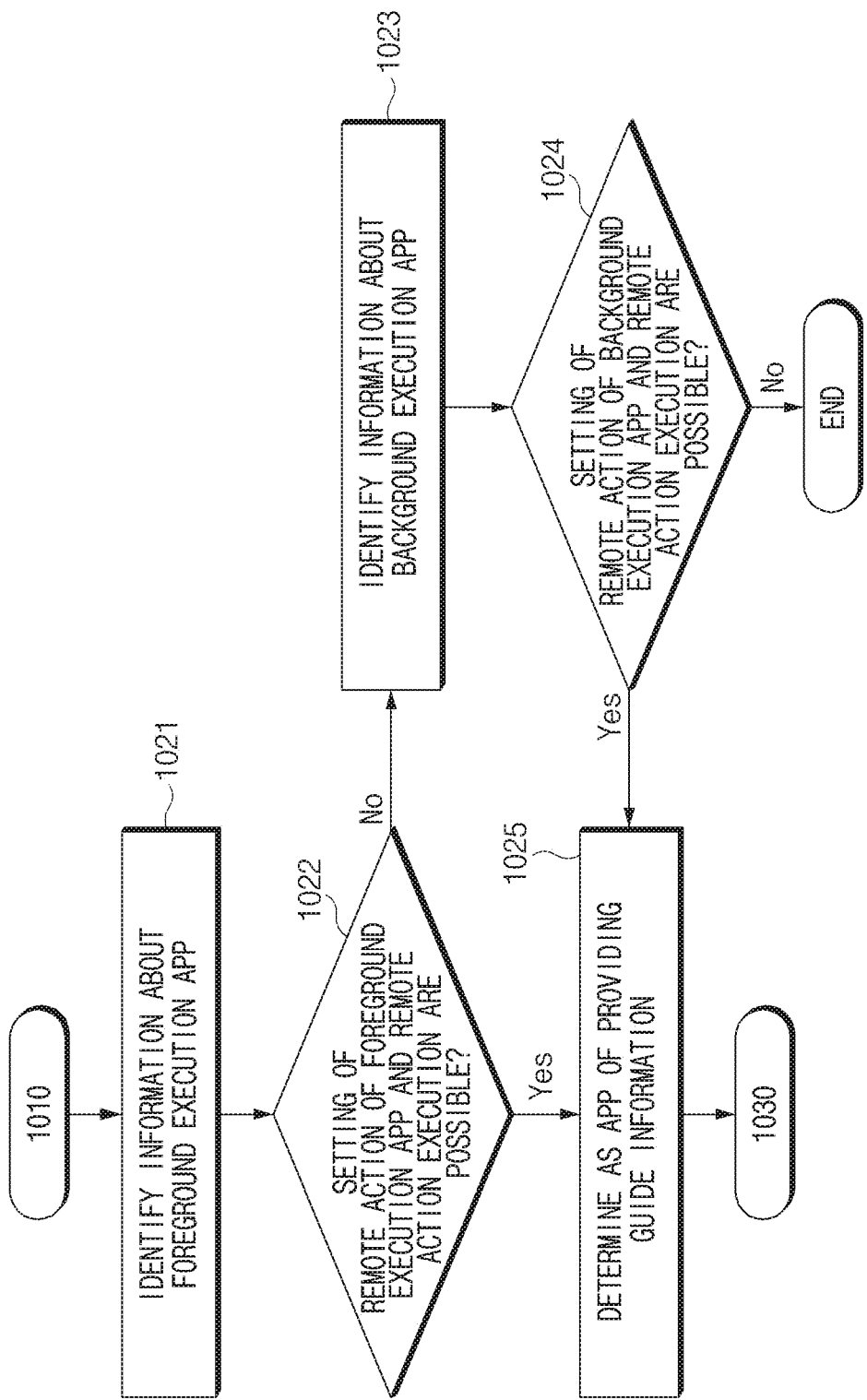
FIG. 10B is a flowchart illustrating a method of determining an app for performing a remote action by an electronic device according to an embodiment of the disclosure.

FIG. 10B is a flowchart illustrating a method of determining an app for performing a remote action by an electronic device according to an embodiment of the disclosure.

Referring to FIG. 10B, operation 1010 will be illustrated in further detail. Initially, in operation 1021, the electronic device 501 may identify information about an app executed in the foreground. The GUI of the app being executed in the foreground may be displayed on the display 540.

According to an embodiment, in operation 1022, the electronic device 501 may determine whether a remote action is set to the app being executed in the foreground. In addition, the electronic device 501 may determine whether the remote action set to the app being executed in the foreground is executable. According to an embodiment, in operation 1025, when the remote action is set to the app being executed in the foreground (Yes), the electronic device 501 may displays guide information related to the remote action set to the app being executed in the foreground on the display 540. In addition, when the remote action set to the app being executed in the foreground is executable, the electronic device 501 may display the guide information on the display 540.

According to an embodiment, in operation 1023, when the remote operation is not set to the app being executed in the foreground, the electronic device 501 may identify the information about the app being executed in the background. In addition, when the action set in the app being executed in the foreground is inexecutable, the electronic device 501 may identify the information about the app being executed in the background.

According to an embodiment, in operation 1024, the electronic device 501 may determine whether the remote action is set to the app being executed in the background. According to an embodiment, when the remote action is not set to the app being executed in the background (No), the electronic device 501 may terminate the process for providing guide information. In addition, when the remote action set to the app being executed in the background is not executable, the electronic device 501 may terminate the process for providing the guide information.

According to an embodiment, the electronic device 501 may provide guide information related to a remote action set in an app being executed in the background when the remote action is set to the app being executed in the background. Alternatively, when the remote action set to the app being executed in the background is executable, the electronic device 501 may provide the guide information.

For example, the electronic device 501 may receive at least one user input through the side button 437 of the digital pen 201 in a state in which a gallery app is executed in the foreground and a media app is executed in the background. In a state in which at least one remote action set to the gallery app is executable, the electronic device 501 may execute at least one action (e.g., displaying of a next image, or displaying of a previous image) of the gallery app corresponding to the received at least one user input (e.g., an input of pushing the side button 437 once, an input of pushing the side button 437 twice, and the like). In a state in which at least one remote action set to the gallery app is inexecutable, the electronic device 501 may execute at least one remote action (e.g., media playback and pause) set to the media app. For example, at least one remote operation set to the media app may be implemented to be performed by definition to correspond to a media control function.

Figure 11:
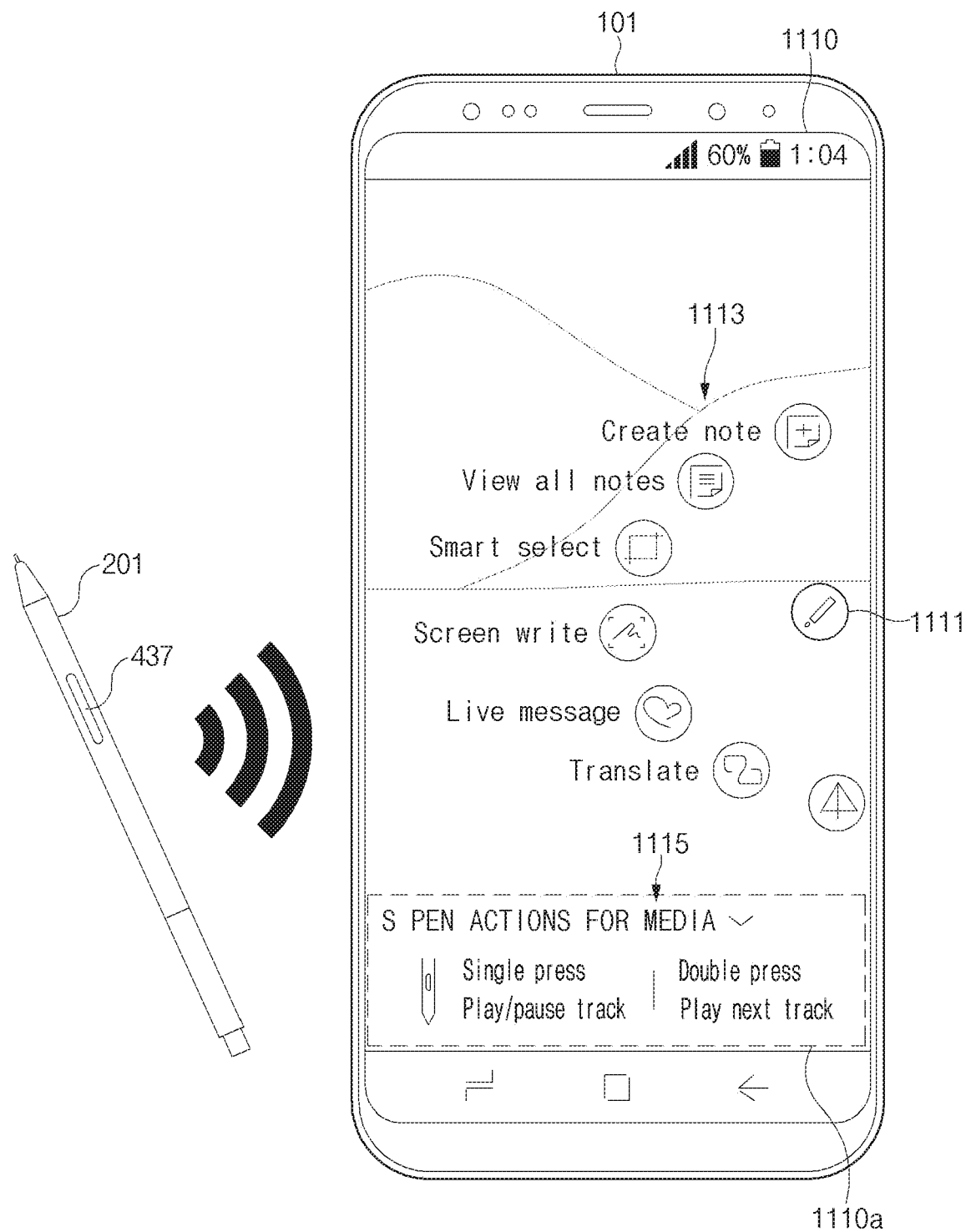
FIG. 11 is a view illustrating a screen for providing guide information by an electronic device according to an embodiment of the disclosure.

FIG. 11 is a view illustrating a screen for providing guide information by an electronic device according to an embodiment of the disclosure.

Referring to FIG. 11, the electronic device 501 may be connected to the digital pen 201 through the communication module 190.

According to an embodiment, in screen 1110, when the digital pen 201 is detached from the electronic device 501, the electronic device 501 may display an object (e.g., a floating icon) 1111 on the display 540. According to an embodiment, the electronic device 501 may display an executable state for the remote action set to the app corresponding to at least one user input through the side button 437 of the digital pen 201 through the object 1111.

According to an embodiment, the electronic device 501 may display, on the display 540, guide information 1113 for a plurality of functions (e.g., creating of a note, viewing of all notes, and the like) that can be performed by using the digital pen 201. The electronic device 501 may display the guide information 1113 for the functions on the display 540 adjacent to the object 1111. For example, the electronic device 501 may display the guide information 1113 for the functions at a specified distance around the object 1111.

According to an embodiment, the electronic device 501 may display, on the display 540, the guide information 1115 about the at least one action (or a remote action) that can be controlled by at least one user input through the side button 437 of the digital pen 201. The electronic device 501 may display the guide information 1115 on a specified portion (e.g., a lower end) 1110a of a screen of the display 540. The guide information 1115 displayed on the display 540 may be information about the remote action set to the app being executed in the foreground.

Figure 12:
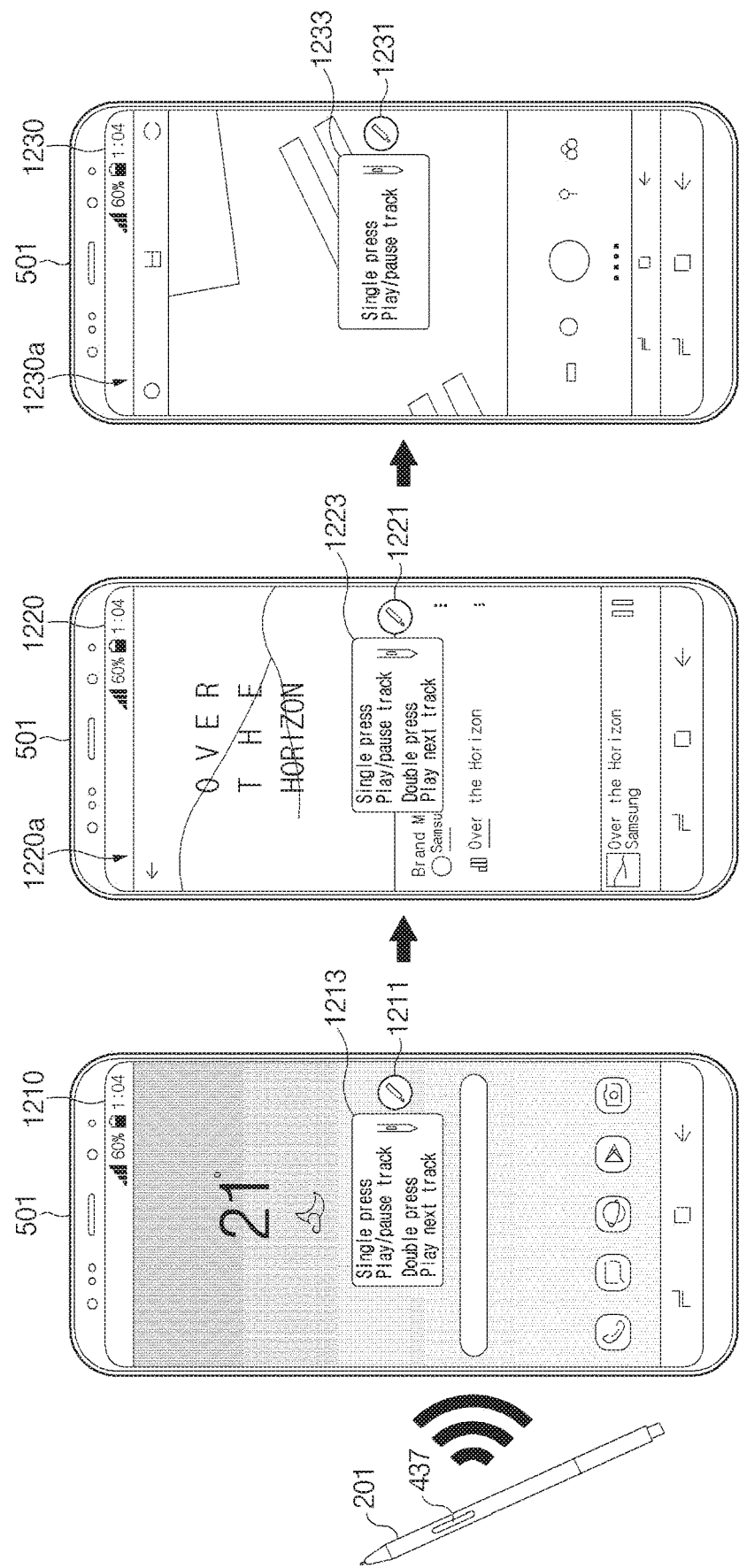
FIG. 12 is a view illustrating a screen for providing guide information for a remote action set to an app by an electronic device according to an embodiment of the disclosure.

FIG. 12 is a view illustrating a screen for providing guide information for a remote action set to an app by an electronic device according to an embodiment of the disclosure.

Referring to FIG. 12, the electronic device 501 may display, on the display 540, the guide information related to the remote action set to the executed app.

According to an embodiment, in a screen 1210, when the digital pen 201 is detached from the electronic device 501, the electronic device 501 may display an object (e.g., a floating icon) 1211 on the display 540. For example, the digital pen 201 may be connected to the electronic device 501 through wireless communication. According to an embodiment, the electronic device 501 may display, on the display, guide information 1213 related to the remote action set to the app being executed in the background. For example, the electronic device 501 may display, on the display 540, the guide information 1213 related to at least one remote action (e.g., playback and pause actions, and skip action) set to the media app being executed in the background.

According to an embodiment, in a screen 1220, the electronic device 501 may execute an app in the foreground. For example, the electronic device 501 may execute a media app that was executed in the background in the foreground. Thus, the electronic device 501 may display, on the display 540, a GUI 1220a of the media app being executed in the foreground. According to an embodiment, the electronic device 501 may display, on the display 540, guide information 1223 for the remote operation set on the app newly executed in the foreground. For example, the electronic device 501 may display, on the display 540, the guide information 1223 related to the remote action set to the media app that is newly executed in the foreground. The guide information 1223 may be displayed adjacent to an object 1221 corresponding to the digital pen 201.

According to an embodiment, in a screen 1230, the electronic device 501 may switch an app being executed in the foreground. For example, the electronic device 501 may newly execute a camera app. The camera app may be executed in the foreground. The electronic device 501 may display a GUI 1230a of the camera app on the display 540. According to an embodiment, the electronic device 501 may display, on the display 540, guide information 1233 related to at least one remote operation 1231 set to the switched app. For example, the electronic device 501 may display, on the display 540, the guide information 1233 related to at least one remote action (e.g., an image photographing action and a camera switching action) set to the switched camera app. For example, at least one remote action set to the camera app may be implemented to be performed by definition to correspond to a camera control function.

Accordingly, the electronic device 501 may display, on the display 540, the guide information 1223 or 1233 related to at least one remote action set to the app being executed in the foreground, when the app is newly executed or terminated, or when the app is switched.

Figure 13:
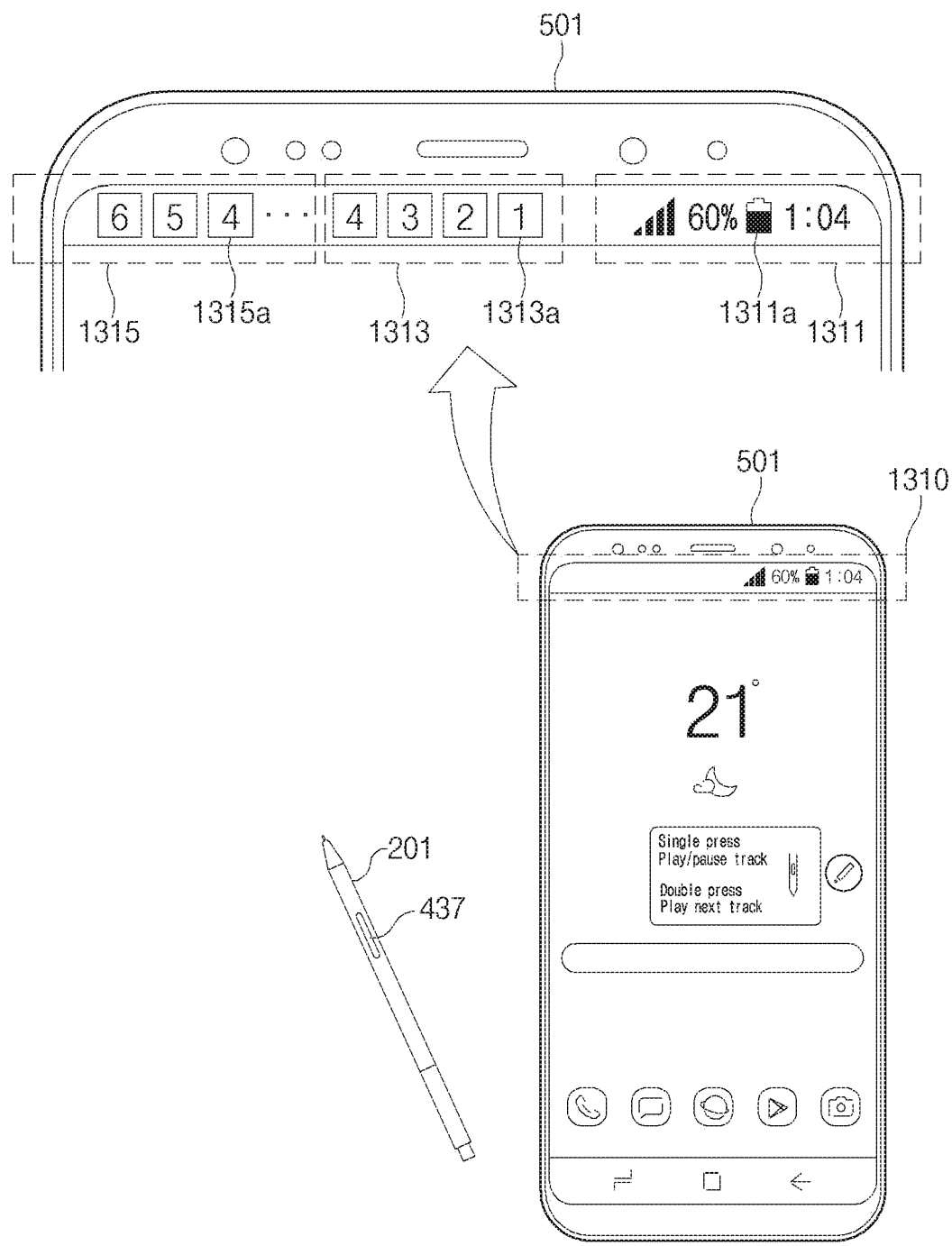
FIG. 13 is a view illustrating an indicator indicating state information of a digital pen in an electronic device according to an embodiment of the disclosure.

FIG. 13 is a view illustrating an indicator indicating state information of a digital pen in an electronic device according to an embodiment of the disclosure.

Referring to FIG. 13, the electronic device 501 may display an indicator indicative of specified information (e.g., display 540 of FIG. 5) on an upper end 1310 of a screen of the display (e.g., display 540 of FIG. 5).

According to an embodiment, the electronic device 501 may display indicators 1311a, 1313a and 1315a indicative of the state of the electronic device (e.g., a battery communication connection state, a charging state, time information, or the like), an activated function (e.g., Bluetooth, alarm, or the like) and notification information in a first area 1311, a second area 1313, and a third area 1315 of the upper end 1310 of the display screen, respectively.

According to an embodiment, the electronic device 501 may display an indicator indicative of state information of the digital pen 201 in the second and third areas 1313 and 1315.

According to an embodiment, the electronic device 501 may display, on the display 540, an indicator 1311a. 1313a, and 1315a indicating the state information of the digital pen 201. According to an embodiment, when the digital pen 201 is detached from the electronic device 501, the electronic device 501 may display an indicator indicating state information of the digital pen 201 in one of the second and third areas 1313 and 1315. In addition, the electronic device 501 may not display any indicator when the digital pen 201 is inserted into the electronic device 501.

Figure 14:
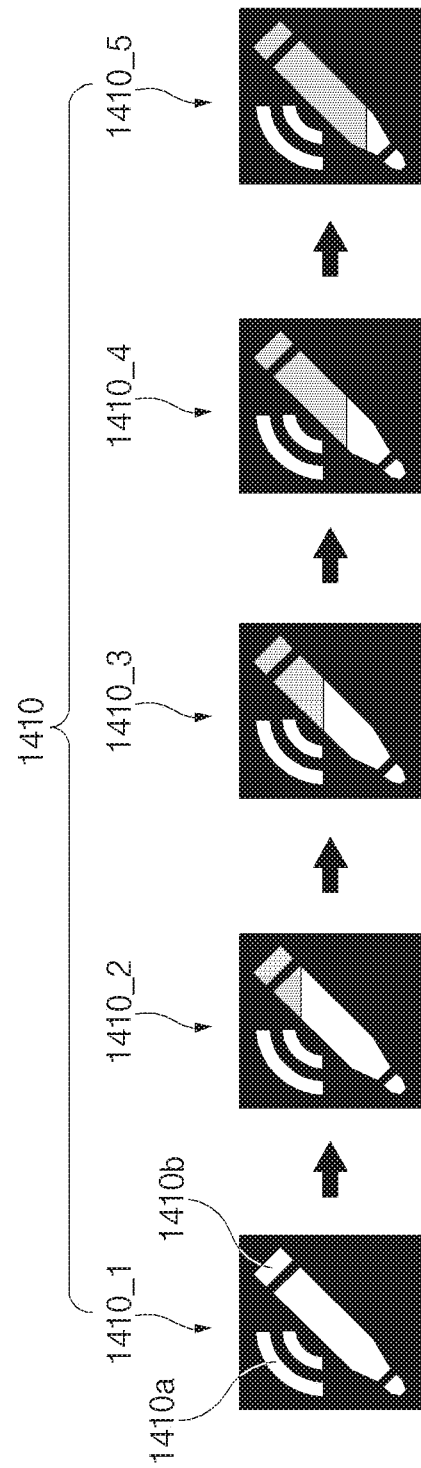
FIG. 14 is a view illustrating an indicator indicating a charging state and a wireless communication connection state of a digital pen by an electronic device according to an embodiment of the disclosure.

FIG. 14 is a view illustrating an indicator indicating a charging state and a wireless communication connection state of a digital pen by an electronic device according to an embodiment of the disclosure.

Referring to FIG. 14, an electronic device (e.g., the electronic device 501 of FIG. 13) may indicate a wireless communication state 1410a and a charging state 1410b of a digital pen (e.g., the digital pen 201 of FIG. 13) through an indicator 1410. According to an embodiment, the electronic device may display the indicator 1410 in a second area (e.g., the second area 1313 of FIG. 13).

According to an embodiment, the electronic device 501 may display an indicator 1410 in a first state 1410_1, a second state 1410_2, a third state 1410_3, a fourth states 1410_4, and a fifth state 1410_5 according to the charging state 1410b of the digital pen 201. For example, the electronic device 501 may indicate the charging state 1410b of the digital pen 201 with the same gap (e.g., 100%, 80%, 60%, 40%, or 20%). As another example, the gap may be specified by more enlarging the gap in a state in which the charging of the battery (e.g., the battery 389 of FIG. 3) is high, or by displaying a remaining amount of the battery of the digital pen 201 of a certain level or more capable of controlling only the minimum action related to disconnection from the electronic device 501 as the lowest charge state. When the gap is made larger in a state where the battery is charged at a high level, the battery state may be displayed at the same level even if the maximum charging amount is reduced due to deterioration of the battery. According to an embodiment, the electronic device may receive information about the charging state of the battery 389 from the digital pen. The digital pen 201 may transmit a signal including information on the charging state at a specified time period.

Figure 15:
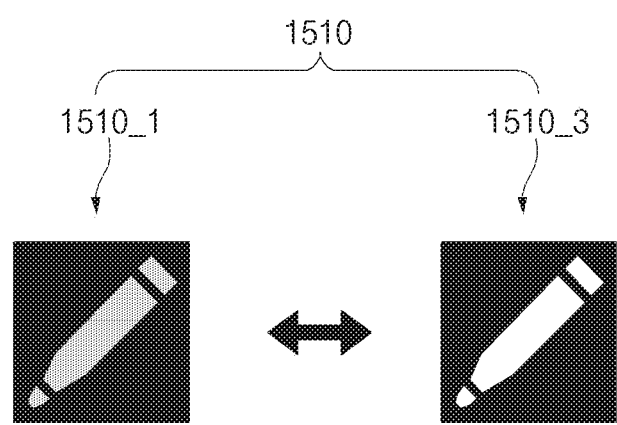
FIG. 15 is a view illustrating an indicator indicating a state of setting connection with a digital pen by an electronic device according to an embodiment of the disclosure.

FIG. 15 is a view illustrating an indicator indicating a state of setting connection with a digital pen by an electronic device according to an embodiment of the disclosure.

Referring to FIG. 15, an electronic device (e.g., the electronic device 501 of FIG. 13) may display, through an indicator 1510, the state of setting a connection using wireless communication. According to an embodiment, the electronic device may display the indicator 1510 in a second area (e.g., the second area 1313 of FIG. 13).

According to an embodiment, the electronic device may indicate a wireless communication connection (e.g., connecting or pairing) by alternately displaying an indicator 1510_1 in the first state and an indicator 1510_3 in the second state.

Figure 16:
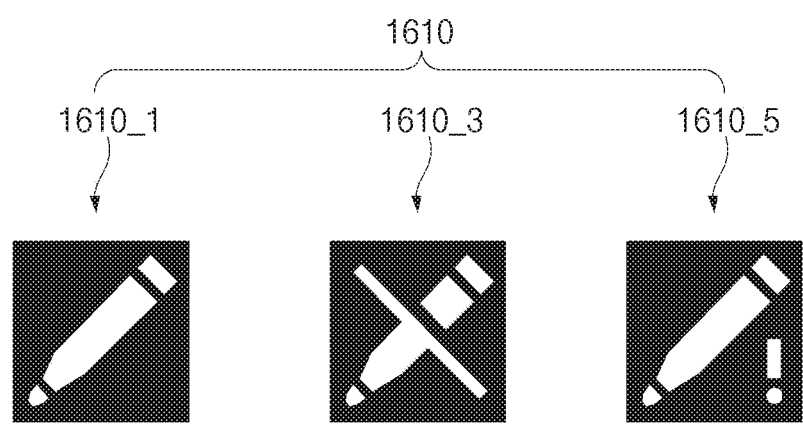
FIG. 16 is a view illustrating an indicator indicating a warning about a state of a digital pen of an electronic device according to an embodiment of the disclosure.

FIG. 16 is a view illustrating an indicator indicating a warning about a state of a digital pen of an electronic device according to an embodiment of the disclosure.

Referring to FIG. 16, an electronic device (e.g., the electronic device 501 of FIG. 13) may indicate, through an indicator 1610, a warning about the connection state of the wireless communication and the battery charge state. According to an embodiment, the electronic device may display the indicator 1610 in a third area (e.g., the third area 1315 of FIG. 13).

According to an embodiment, the electronic device may display an indicator 1610_1 in a normal action state. For example, the normal action state may be a state in which a wireless communication connection with the electronic device is set and the remaining charging amount of the battery 389 of the digital pen 201 is sufficient to perform a specified action.

According to an embodiment, the electronic device 501 may display an indicator 1610_3 in a disconnected state with the digital pen 201. According to an embodiment, the electronic device 501 may display an indicator 1610_5 in a state in which the remaining charge amount of the battery 389 is low. For example, the low state of a charge amount of the battery 389 may be a state in which it is insufficient to perform a specified action.

Figure 17:
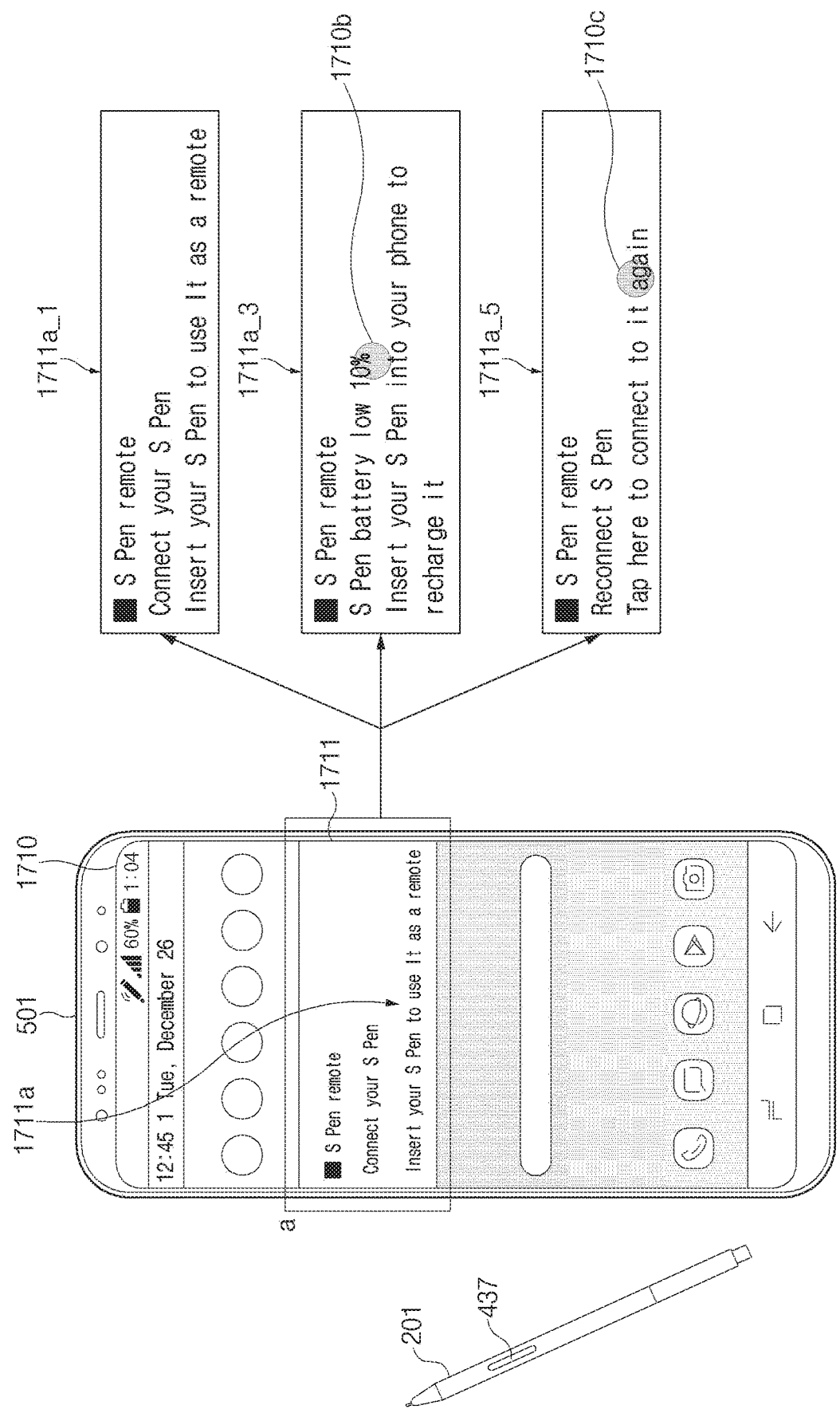
FIG. 17 is a view illustrating a screen showing a panel showing a state of a digital pen of an electronic device according to an embodiment of the disclosure.

FIG. 17 is a view illustrating a screen showing a panel showing a state of a digital pen of an electronic device according to an embodiment of the disclosure.

Referring to FIG. 17, the electronic device 501 may display state information 1711a of the digital pen 201 on a portion 'a' of a panel 1711 which is scrolled down at an upper end of a display screen 1710.

According to an embodiment, when the digital pen 201 is not connected to the communication module 190, the electronic device 501 may display information 1711a1 about a state in which the digital pen 201 is not connected to the panel 1711. According to an embodiment, when the charge amount of the battery 389 of the digital pen 201 is not sufficient, the electronic device 501 may display charge amount information 1711a_3 of the battery 389 of the digital pen 201 on the panel 1711. When an input 1710b for selecting the charge amount information 1711a_3 of the battery 389 of the digital pen 201 is received, the electronic device 501 my provide information for charging the battery 389 of the digital pen 201 to the user.

According to an embodiment, when the connection attempt with the digital pen 201 fails, the electronic device 501 may display connection failure information 1711a_5 of the digital pen 201 on the panel 1711. When receiving an input 1710c for selecting the connection failure information 1711a_5 of the digital pen 201, the electronic device 501 may retry the action of wirelessly connecting with the digital pen 201.

Figure 18:
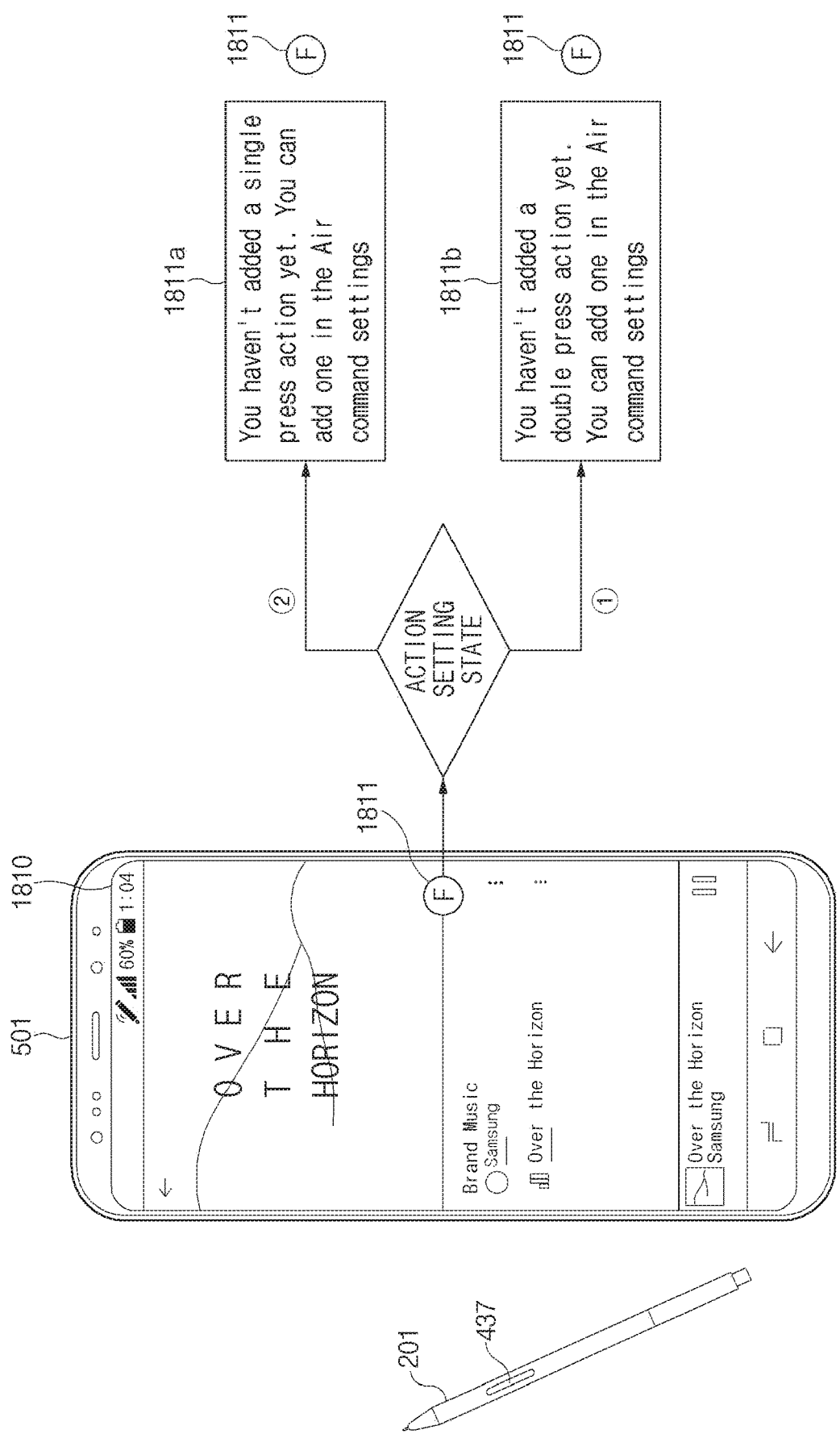
FIG. 18 is a view illustrating a method of setting a remote action to an app being executed by an electronic device according to an embodiment of the disclosure.

FIG. 18 is a view illustrating a method of setting a remote action to an app being executed by an electronic device according to an embodiment of the disclosure.

Referring to FIG. 18, a remote action may not be set to an app (e.g., a media app) being executed in the electronic device 501. The electronic device 501 may display the GUI of the app being executed on a display screen 1810.

According to an embodiment, when the digital pen 201 is detached from the electronic device 501, the electronic device 501 may display an object (e.g., a floating icon) 1811 on the display 540. According to an embodiment, the electronic device 501 may set at least one remote action corresponding to at least one user input received through the side button 437 of the digital pen 201 through the object 1811. For example, the electronic device 501 may set a remote action (e.g., music playback and pause) corresponding to an input 1 of pressing the side button 437 of the digital pen 201 once. In addition, the electronic device 501 may set a remote action (e.g., a skip action) corresponding to an input 2 of pressing the side button 437 of the digital pen 201 once. According to an embodiment, the electronic device 501 may provide the user with information 1811a and 1811b related to at least one settable remote action. The information 1811a and 1811b related to at least one settable remote action may be displayed adjacent to the object 1811.

Figure 19:
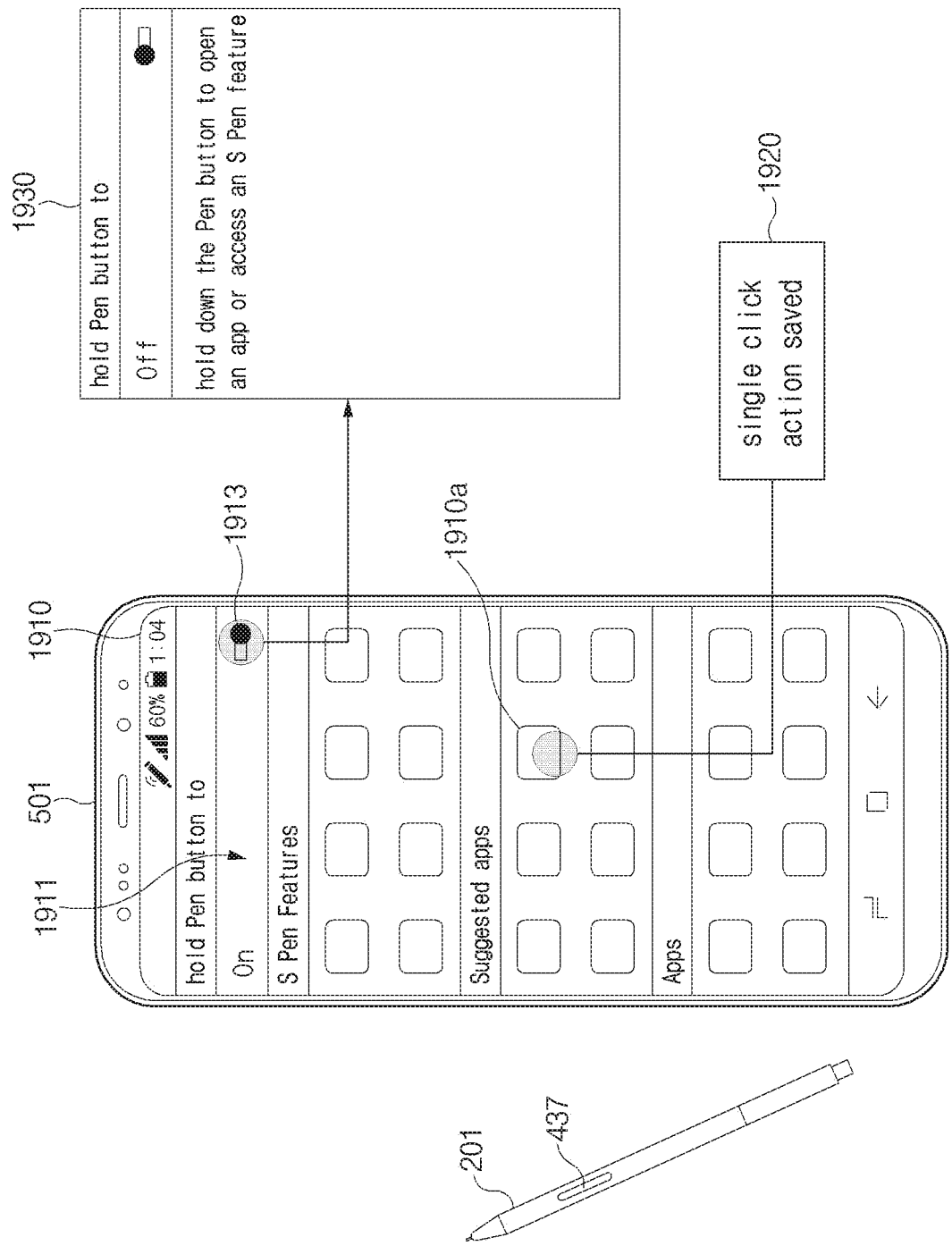
FIG. 19 is a view illustrating a method of setting a remote action to an app installed in an electronic device according to an embodiment of the disclosure.

FIG. 19 is a view illustrating a method of setting a remote action to an app installed in an electronic device according to an embodiment of the disclosure.

Referring to FIG. 19, the electronic device 501 may set a remote action corresponding to an input of pressing and holding the side button 437 of the digital pen 201.

According to an embodiment, the electronic device 501 may display, on a display screen 1910, a list 1911 of apps for setting remote actions corresponding to inputs of pressing and holding the side button 437 of the digital pen 201. The list 1911 of apps may include an object (e.g., an icon) corresponding to the installed app. According to an embodiment, the electronic device 501 may separately display a recommended app or the like.

According to an embodiment, the electronic device 501 may receive an input 1910*a* for selecting one object from the list 1911 of apps and set a remote action corresponding to the long-pressing input. According to an embodiment, the electronic device 501 may display, on a display screen 1920, information about a remote action executed by a long-pressing input in the selected app.

According to an embodiment, the electronic device 501 may turn on or off a function of remotely controlling a remote action corresponding to an input of pressing and holding the side button 437 of the digital pen 201 through an activation button 1913. For example, when the remote control function is turned on through the activation button 1913, the electronic device 501 may display the list 1911 of apps on the display 540. In addition, when the remote control function is turned off through the activation button 1913, the electronic device 501 may hide the list 1911 of apps from the display screen 1930. The electronic device 501 according to the various embodiments of the disclosure described with reference to in FIGS. 1 to 19 may perform an action corresponding to a user input received through the side button 437 of the digital pen 201 based on the state of the app being executed, so that the user may remotely control the electronic device 501 by using the side button 437 of the digital pen 201 without changing the setting for the input.

In addition, when the digital pen 201 is detached from the electronic device 501, the electronic device 501 may allow the user to clearly recognize the execution contents of an action by the user input by providing the guide information for the action corresponding to the user input received through the side button 437 of the digital pen 201.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). When an (e.g., first) element is referred to as being "(operatively or communicatively) coupled with/to" or "connected to" another (e.g., second) element with or without term "functionally" or "communicationally", it may be directly coupled with/to or connected to the other element or an intervening element (e.g., a third element) may be present.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 140) including an instruction stored in a machine-readable storage medium (e.g., an internal memory 136 or an external memory 138) readable by a machine (e.g., the electronic device 101 and 501). For example, the processor of a machine (e.g., the electronic device 101 and 501) may call the instruction from the machine-readable storage medium and execute the instructions thus called. This means that the machine may perform at least one function based on the called at least one instruction. The one or more instructions may include a code generated or executed by a compiler or an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

According to the embodiments, the electronic device may perform an action corresponding to a user input received through the button of the digital pen based on the state of the app being executed, so that the user may remotely control the electronic device by using the button of the digital pen 201 without changing the setting for the input.

In addition, when the digital pen is detached from the electronic device, the electronic device may allow the user to clearly recognize the execution contents of an action by the user input by providing the guide information for the action corresponding to the user input received through the button of the digital pen.

In addition, various effects that are directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a digital pen;
a wireless communication circuit;
a processor; and
a memory operatively connected to the processor,
wherein the memory stores instructions which, when executed, cause the processor to:
identify an application being executed among a plurality of applications including a first application and a second application different from the first application,
receive a first input through the wireless communication circuit from the digital pen, wherein the first input is received through a button included in the digital pen and corresponds to a first operation of the first application and to a second operation of the second application,
when the identified application corresponds to the first application, identify and perform the first operation of the first application corresponding to the first input, and
when the identified application corresponds to the second application, identify and perform the second operation of the second application corresponding to the first input, and
wherein the first operation is different from the second operation.

2. The electronic device of claim 1, further comprising:
a housing; and
a display,
wherein the digital pen is inserted into the housing, and
wherein the instructions further cause the processor to:
identify that the digital pen is separated from the electronic device, and
display, on the display, information associated with the digital pen based on the separation of the digital pen from the electronic device.

3. The electronic device of claim 2, wherein the information associated with the digital pen includes at least one of information associated with an operation capable of being performed through the first input by using the digital pen, information about a wireless connection state of the electronic device and the digital pen, or battery information of the digital pen.

4. The electronic device of claim 1, further comprising:
a display,
wherein the instructions further cause the processor to, when the identified application being executed corresponds to the first application, display, on the display, information of the first operation of the first application corresponding to the first input.

5. The electronic device of claim 1, wherein the instructions further cause the processor to store, in the memory, data defining the first operation and data defining the second operation.

6. The electronic device of claim 1, further comprising:
a display,
wherein the instructions further cause the processor to:
display, on the display, a first user interface that controls whether to use the first operation when the first input is received and the identified application is-being executed corresponds to the first application; and
display, on the display, a second user interface that controls whether to use the second operation when the first input is received and the identified application being executed corresponds to the second application.

7. The electronic device of claim 1, wherein the instructions further cause the processor to:
receive a second input from the digital pen through the wireless communication circuit, and
in response to the second input, associate the first operation with the first application and associate the second operation with the second application based on the second input.

8. The electronic device of claim 1, further comprising:
a display,
wherein the instructions further cause the processor to:
display, on the display, a user interface associated with the first operation based on the identification of the first operation, and
display, on the display, a user interface associated with the second operation based on the identification of the second operation.

9. The electronic device of claim 1, further comprising:
a display,
wherein, when the identified application is-being executed corresponds to the first application, the instructions further cause the processor to:
identify whether the first application is executed in a foreground from a plurality of applications being executed in the electronic device,
identify whether the first operation is capable of being performed by the first application,
when the first operation is capable of being performed by the first application, display, on the display, an interface that provides information about the first operation,
when the first operation is incapable of being performed by the first application, identify the second application being executed in a background among the plurality of applications,
identify whether the second operation is capable of being performed by the second application, and
when the second operation is capable of being performed by the second application, display, on the display, an interface that provides information about the second operation.

10. The electronic device of claim 1,
wherein the digital pen includes a button, and
wherein the first input includes at least one of a pressing of the button once, a pressing of the button twice, or a long pressing of the button.

11. A method of controlling an electronic device including a digital pen, the method comprising:

identifying an application being executed among a plurality of applications including a first application and a second application different from the first application;
receiving a first input through a wireless communication circuit of the electronic device from the digital pen, wherein the first input is received through a button included in the digital pen and corresponds to a first operation of the first application and corresponds to a second operation of the second application;
when the identified application corresponds to the first application, identifying and performing the first operation of the first application corresponding to the first input; and
when the identified application corresponds to the second application, identifying and performing the second operation of the second application corresponding to the first input,
wherein the first operation is different from the second operation.

12. The method of claim 11, further comprising:
identifying that the digital pen is located in contact with the electronic device and that the digital pen is separated from the electronic device; and
displaying, on a display, information associated with the digital pen based on the separation of the digital pen from the electronic device.

13. The method of claim 12, wherein the information associated with the digital pen includes at least one of information associated with an operation capable of being performed through the first input by using the digital pen, information about a wireless connection state of the electronic device and the digital pen, or battery information of the digital pen.

14. The method of claim 11, further comprising:
when the first application is being executed, displaying, on a display, information of the first operation of the first application corresponding to the first input.

15. The method of claim 11, further comprising:
storing, in a memory, data defining the first operation and data defining the second operation.

16. The method of claim 11, further comprising:
displaying, on a display, a first user interface that controls whether to use the first operation when the first input is received and the identified application being executed corresponds to the first application; and
displaying, on the display, a second user interface that controls whether to use the second operation when the first input is received and the identified application being executed corresponds to the second application.

17. The method of claim 11, further comprising:
receiving a second input from the digital pen; and
in response to the second input, associating the first operation with the first application and associating the second operation with the second application.

18. The method of claim 11, further comprising:
displaying, on a display, a user interface associated with the first operation based on the identifying of the first operation; and
displaying, on the display, a user interface associated with the second operation based on the identifying of the second operation.

19. The method of claim 11, further comprising:
when the identified application being executed corresponds to the first application, identifying whether the first application is executed in a foreground among a plurality of applications being executed in the electronic device;
identifying whether the first operation is capable of being performed by the first application;
when the first operation is capable of being performed by the first application, displaying, on a display, an interface that provides information about the first operation;
when the first operation is incapable of being performed by the first application, identifying the second application being executed in a background among the plurality of applications;
identifying whether the second operation is capable of being performed by the second application; and
when the second operation is capable of being performed by the second application, displaying, on the display, an interface that provides information about the second operation.

20. The method of claim 11,
wherein the digital pen includes a button, and
wherein the first input includes at least one of a pressing of the button once, a pressing of the button twice, or a long pressing of the button.

* * * * *